United States Patent
Zhu et al.

(10) Patent No.: US 11,419,171 B2
(45) Date of Patent: Aug. 16, 2022

(54) METHOD FOR ESTABLISHING SUBFLOW OF MULTIPATH CONNECTION, APPARATUS, AND SYSTEM

(71) Applicant: HUAWEI TECHNOLOGIES CO., LTD., Guangdong (CN)

(72) Inventors: Jianjian Zhu, Shenzhen (CN); Feng Li, Shenzhen (CN); Qiubin Song, Shenzhen (CN); Jian He, Shenzhen (CN); Jiqing Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/126,799

(22) Filed: Dec. 18, 2020

(65) Prior Publication Data
US 2021/0105845 A1   Apr. 8, 2021

Related U.S. Application Data

(63) Continuation of application No. PCT/CN2019/112460, filed on Oct. 22, 2019.

(30) Foreign Application Priority Data

Oct. 26, 2018   (CN) .......................... 201811260980.3

(51) Int. Cl.
*H04W 76/15* (2018.01)
*H04W 76/11* (2018.01)
(Continued)

(52) U.S. Cl.
CPC ............. *H04W 76/15* (2018.02); *H04L 45/24* (2013.01); *H04L 61/2007* (2013.01); *H04W 76/11* (2018.02)

(58) Field of Classification Search
CPC ... H04L 45/24; H04L 47/193; H04L 61/2007; H04L 69/14; H04W 76/11; H04W 76/15
See application file for complete search history.

(56) References Cited

U.S. PATENT DOCUMENTS

| | | | | |
|---|---|---|---|---|
| 2011/0296006 | A1* | 12/2011 | Krishnaswamy | ........................... H04L 29/12952 709/224 |
| 2012/0331160 | A1* | 12/2012 | Tremblay | .............. H04L 69/163 709/228 |

(Continued)

FOREIGN PATENT DOCUMENTS

| | | |
|---|---|---|
| CN | 103004167 A | 3/2013 |
| CN | 104243443 A | 12/2014 |

(Continued)

OTHER PUBLICATIONS

ZTE Wistron,"MPTCP Deployment Scenarios in today network", SA WG2 Meeting #128bis S2-187756, Aug. 19-24, 2018, Sophia Antipolis, France, total 3 pages.

*Primary Examiner* — Saad A. Waqas
(74) *Attorney, Agent, or Firm* — Womble Bond Dickinson (US) LLP

(57) ABSTRACT

This application provides a subflow establishment method. A local-end device obtains an identifier of an operator currently accessed by a network interface card of the local end device. The local-end device obtains a plurality of IP addresses of a peer-end device and identifiers of operators to which the plurality of IP addresses are homed; and establishes, by matching a plurality of operators corresponding to the local-end device and the plurality of operators corresponding to the peer-end device, a subflow between an IP address pair homed to a same operator. In this way, the established subflow does not cross operators as far as possible. This reduces negative impact of cross-operator (Continued)

communication of some subflows on transmission performance of a multipath connection, thereby better leveraging an advantage of the multipath connection in transmission performance in comparison with a single-path connection.

17 Claims, 10 Drawing Sheets

(51) Int. Cl.
    *H04L 45/24*     (2022.01)
    *H04L 61/5007*     (2022.01)

(56) References Cited

U.S. PATENT DOCUMENTS

| | | | |
|---|---|---|---|
| 2013/0064198 | A1 | 3/2013 | Krishnaswamy et al. |
| 2014/0160960 | A1 | 6/2014 | Qi |
| 2015/0156122 | A1* | 6/2015 | Singh ............... H04L 61/1511 370/235 |
| 2017/0339219 | A1 | 11/2017 | Le et al. |
| 2018/0109473 | A1* | 4/2018 | Boucadair ............ H04L 45/70 |
| 2020/0245162 | A1* | 7/2020 | Dion ................. H04W 40/14 |

FOREIGN PATENT DOCUMENTS

| | | |
|---|---|---|
| CN | 106100986 A | 11/2016 |
| CN | 108075987 A | 5/2018 |
| CN | 108366104 A | 8/2018 |
| WO | 2015118020 A1 | 8/2015 |

* cited by examiner

| 0 1 2 3 4 5 6 7 | 0 1 2 3 4 5 6 7 | 0 1 2 3 4 5 6 7 | 0 1 2 3 4 5 6 7 |
|---|---|---|---|
| Kind | Length | Subtype | Address ID |
|  |  | IP Version |  |
| IP address (IPv4 - 4 octets / IPv6 - 16 octets) | | | |
| Port (2 octets, optional field) | | Operation information (which may be used to carry an operator identifier) | |

FIG. 6

METHOD FOR ESTABLISHING SUBFLOW OF MULTIPATH CONNECTION, APPARATUS, AND SYSTEM

CROSS-REFERENCE TO RELATED APPLICATIONS

This application is a continuation of International Patent Application No. PCT/CN2019/112460, filed on Oct. 22, 2019, which claims priority to Chinese Patent Application No. 201811260980.3, filed on Oct. 26, 2018. The disclosures of the aforementioned applications are hereby incorporated by reference in their entireties.

TECHNICAL FIELD

This application relates to the communications field, and in particular, to a method for establishing a subflow of a multipath connection, an apparatus, and a system.

BACKGROUND

Computer applications often need to exchange information with each other. These applications may be described by using a system structural architecture of a software system, that is, a client/server (C/S) software system architecture. In such an architecture, the client and the server are applications. An application acting as the client requests a service, and an application acting as the server provides the service for the application acting as the client. In some scenarios, client and server run on different devices. For example, when an application running on a terminal is a client; and an application running on a server is a serving end. Apparently, the client and the serving end need to exchange information with each other. For example, the information may be transmitted by using a multipath transmission technology.

In the multipath transmission technology, data is transmitted in parallel by using a plurality of subflows between the client and the serving end, and each subflow corresponds to one path. For example, the multipath transmission control protocol (MPTCP) is based on the transmission control protocol (TCP). Multipath transmission technologies may be collectively referred to as MP technologies, and a connection including a plurality of subflows is referred to as a multipath connection, namely, an MP connection. Each of the plurality of subflows corresponds to a different link between the client and the serving end, and the plurality of subflows are referred to as the multipath connection. In theory, in comparison with single-path transmission, the multipath transmission technology helps increase a data throughput, and therefore is applicable to online video playing and data downloading. The multipath transmission technology also helps reduce a latency and improve data transmission reliability, and therefore is applicable to game playing. Data may be transmitted in the plurality of subflows based on at least one of a Wi-Fi network and a cellular network. The cellular network may be a 5G network, a 4G network such as a long term evolution (LTE) network, a 3G network such as a code division multiple access (CDMA) network, a 2G network, or the like.

However, after a plurality of subflows of a multipath connection are established in a relatively complex network environment by using an existing method, transmission performance (such as a throughput or a latency) of the multipath connection cannot be improved as in theory compared to that in single-path transmission, and sometimes the transmission performance is even poorer than transmission performance achieved when only some of the subflows are used.

SUMMARY

In view of this, this application provides a method for establishing a subflow of a multipath connection and an apparatus. Considering impact of a plurality of operators supported by a multipath connection on transmission performance of the multipath connection, for each established subflow, networks accessed by two end nodes of the subflow are homed to a same operator. This can better ensure the transmission performance of the multipath connection, and also can better leverage an advantage of the multipath connection in transmission performance in comparison with a single-path connection.

According to a first aspect, this application describes a subflow establishment method. The method includes: determining, by a first device, an identifier of an operator whose network is accessed by each of a plurality of network interface cards of the first device; determining, by the first device, a plurality of Internet Protocol (IP) addresses of a second device and an identifier of an operator corresponding to each of the plurality of IP addresses of the second device; and establishing, by the first device, a plurality of first subflows based on the identifier of the operator whose network is accessed by each of the plurality of network interface cards and the identifier of the operator corresponding to each of the plurality of IP addresses of the second device, where the plurality of first subflows are subflows of a multipath connection between the first device and the second device, and an operator whose network is accessed by a network interface card that is of the first device and that is used by each of the plurality of first subflows is the same as an operator corresponding to an IP address that is of the second device and that is used by the first subflow.

In one embodiment, the first device preferentially establishes the plurality of first subflows based on the identifier of the operator whose network is accessed by each of the plurality of network interface cards and the identifier of the operator corresponding to each of the plurality of IP addresses of the second device, and does not establish a cross-operator subflow as far as possible. The cross-operator subflow is a subflow on which an operator whose network is accessed by a network interface card that is of the first device and that is used by the subflow is different from an operator corresponding to an IP address that is of the second device and that is used by the subflow.

In one embodiment, the first device establishes only the plurality of first subflows based on the identifier of the operator whose network is accessed by each of the plurality of network interface cards and the identifier of the operator corresponding to each of the plurality of IP addresses of the second device, and does not establish a cross-operator subflow.

There is no strict time sequence between the several operations of the foregoing method. Therefore, there are a plurality of embodiments. For example, a operation in which the first device determines the identifier of the operator corresponding to each of the plurality of network interface cards of the local end and a operation in which the first device determines a plurality of IP addresses of a peer end and an identifier of an operator corresponding to each of the plurality of IP addresses may be performed at the same time, or any one of the operations may be performed first. For another example, a process of establishing the plurality of first subflows may be performed in a process in which the first device determines the identifier of the operator corresponding to each of the plurality of network interface cards of the local end and the first device determines a plurality of IP addresses of a peer end and an identifier of an operator corresponding to each of the plurality of IP addresses. For example, the first device first determines the identifier of the operator corresponding to each of the plurality of network interface cards and one IP address of the second device, where the IP address corresponds to a same operator as that of a current default network interface card of the plurality of network interface cards of the first device. The first device first establishes a main subflow by using this pair of IP address and network interface card; receives, from the second device by using the main subflow, other IP addresses and an identifier of an operator corresponding to each of the other IP addresses; and then establishes another non-cross-operator subflow by matching the identifier of the operator corresponding to each of the plurality of network interface cards of the first device and the identifier of the operator corresponding to each of the plurality of IP addresses of the second device. Alternatively, after establishing the main subflow, the first device locally determines other IP addresses of the second device and an identifier of an operator corresponding to each of the other IP addresses, and then performs matching.

The first device is a local-end device, and the second device is a peer-end device. The first device runs a client and the second device runs a serving end, or the first device runs a serving end and the second device runs a client. The client and the serving end are applications of a same type. A multipath connection between the first device and the second device is a multipath connection between the client and the serving end. The first device and the second device each may be a device supporting a multipath transmission protocol, such as a terminal device or a cloud-based device, a server agent in a network, or a multipath transmission gateway.

A network interface card may be a physical network interface card, or may be a virtual network interface card. There are a plurality of network interface card products. Some network interface cards, such as SIM cards, have respective operators. Some other network interface cards do not correspond to operators if not powered on. For this type of network interface card, a corresponding operator is an operator of a network accessed when the network interface card is operating. An identifier of an operator whose network is accessed by a network interface card of the first device is an identifier of an operator of a network accessed by the network interface card during current execution of the method. Therefore, a network interface card preferentially used by the first device is a network interface card used by the first device to access a network that is preferentially accessed currently.

An identifier of an operator corresponding to an IP address of the second device is an identifier of an operator of a network accessed by the second device by using the IP address, for example, is an identifier of an operator to which the IP address of the second device is homed.

An identifier of an operator whose network is accessed by a network interface card and an identifier of an operator corresponding to an IP address of the second device may be identifiers in different forms, provided that the identifiers can indicate the operators. Therefore, different operator identifiers may indicate a same operator.

In this way, in the method described in the first aspect, the first device determines the operator whose network is accessed by each of the plurality of network interface cards of the local end and the operator corresponding to each of the plurality of IP addresses of the peer end; and establishes, through matching, preferentially or only a subflow between a network interface card and a peer-end IP address that correspond to a same operator. Considering impact of a plurality of operators supported by the multipath connection on an established subflow, for each established subflow, networks accessed by two end nodes of the subflow are homed to a same operator. This can better ensure transmission performance of the multipath connection, and also can better leverage an advantage of the multipath connection in transmission performance in comparison with a single-path connection.

The first device may locally obtain the plurality of IP addresses of the second device and the identifier of the operator corresponding to each of the plurality of IP addresses of the second device. "local" means the first device. In other words, the information does not need to be obtained from another device. The information may be obtained by a multipath transmission protocol stack of the first device from the client of the first device, or may be delivered proactively by the client of the first device to the multipath transmission protocol stack of the first device. Alternatively, the information may be obtained by a multipath transmission protocol stack of the first device from a configuration module that is of the first device and that is located at an application layer or a transport layer, or may be delivered proactively by the configuration module to the multipath transmission protocol stack of the first device. The configuration module is configured to obtain, from the client, the plurality of IP addresses of the second device and the identifier of the operator corresponding to each of the plurality of IP addresses of the second device.

Alternatively, the first device may receive, from the second device, the plurality of IP addresses of the second device and the identifier of the operator corresponding to each of the plurality of IP addresses of the second device. In other words, the second device sends the information to the first device. For example, the information may be carried in address notification signaling with an extension field.

There may be a plurality of embodiments for establishing, by the first device, the plurality of first subflows based on the identifier of the operator whose network is accessed by each of the plurality of network interface cards and the identifier of the operator corresponding to each of the plurality of IP addresses of the second device. The following describes several embodiments thereof.

In one embodiment, each of the plurality of network interface cards of the first device corresponds to an IP address of the first device. The first device determines a plurality of IP address pairs by matching the identifier of the operator whose network is accessed by each of the plurality of network interface cards and the identifier of the operator corresponding to each of the plurality of IP addresses of the second device, where an operator whose network is accessed by a network interface card corresponding to an IP address of the first device in each of the plurality of IP address pairs is the same as an operator corresponding to an IP address of the second device included in the IP address pair; and the first device establishes only or preferentially a plurality of first subflows that are in a one-to-one correspondence with the plurality of IP address pairs.

In other words, a plurality of matching IP address pairs are found based on an operator corresponding to a local-end network interface card and an operator corresponding to a peer-end IP address, and then a subflow is established.

In one embodiment, the first device determines, by matching the identifier of the operator whose network is accessed by each of the plurality of network interface cards and the identifier of the operator corresponding to each of the plurality of IP addresses of the second device, an IP address that is of the second device and that corresponds to each of the plurality of network interface cards, where an operator corresponding to the IP address that is of the second device and that corresponds to each of the plurality of network interface cards is the same as the operator whose network is accessed by the network interface card; and the first device sends, by using the plurality of network interface cards, a packet only to the IP address that is of the second device and that corresponds to each of the plurality of network interface cards, to establish the plurality of first subflows.

In other words, the first device first determines a correspondence between a local-end network interface card and a peer-end IP address, and a local-end network interface card only uses a peer-end IP address corresponding to the network interface card to perform communication, to ensure that an established subflow does not cross operators.

In one embodiment, the first device obtains a plurality of combinations, where each of the plurality of combinations indicates a combination of one of the plurality of network interface cards and one of the plurality of IP addresses; and if an operator whose network is accessed by the network interface card indicated by each of the plurality of combinations is the same as an operator corresponding to the IP address indicated by the combination, establishes one first subflow by using the combination of the network interface card and the IP address; or if an operator whose network is accessed by the network interface card indicated by each combination is different from an operator corresponding to the IP address indicated by the combination, prohibits establishment of a subflow by using the combination of the network interface card and the IP address.

In other words, various combinations of the plurality of network interface cards of the local end and the plurality of IP addresses of the peer end are first obtained through combination. Then each combination is verified to determine whether a network interface card and an IP address in the combination correspond to a same operator. If the network interface card and the IP address in the combination correspond to the same operator, a subflow is established; or if the network interface card and the IP address in the combination do not correspond to the same operator, a subflow is not established.

In one embodiment, the first device establishes a plurality of subflows based on the plurality of network interface cards and the plurality of IP addresses of the second device, where the plurality of subflows include the plurality of first subflows; and the first device removes all second subflows in the plurality of subflows by matching the identifier of the operator whose network is accessed by each of the plurality of network interface cards and the identifier of the operator corresponding to each of the plurality of IP addresses of the second device, where an operator whose network is accessed by a network interface card that is of the first device and that is used by the second subflow is different from an operator corresponding to an IP address that is of the second device and that is used by the second subflow.

In other words, subflows are established regardless of operators, and cross-operator subflows in the established subflows are removed based on the identifier of the operator whose network is accessed by each of the plurality of network interface cards and the identifier of the operator corresponding to each of the plurality of IP addresses of the second device.

It can be learned that there may be a plurality of embodiments for the subflow establishment method described in this application.

According to a second aspect, this application records a subflow establishment method. The method is applied to a first device. The first device includes a first network interface card and at least one second network interface card, and the first network interface card is a network interface card preferentially used by the first device currently. The method includes: determining, by the first device, an identifier of an operator whose network is accessed by each of the at least one second network interface card; sending, by the first device, a packet to a first Internet Protocol (IP) address of the second device by using the first network interface card, to establish a main subflow of a multipath connection between the first device and the second device, where an operator whose network is accessed by the first network interface card is the same as an operator corresponding to the first IP address; receiving, by the first device from the second device by using the main subflow, at least one second IP address and an identifier of an operator corresponding to each of the at least one second IP address, where the at least one second IP address is an IP address other than the first IP address of the second device; and establishing, by the first device, at least one other subflow of the multipath connection based on the identifier of the operator whose network is accessed by each of the at least one second network interface card and the identifier of the operator corresponding to each of the at least one second IP address, where an operator whose network is accessed by a second network interface card used by each of the at least one other subflow is the same as an operator corresponding to a second IP address used by the subflow.

A multipath transmission protocol stack of the first device may obtain the first IP address of the second device from a client of the first device.

The method described in the second aspect may be considered as an embodiment of the method described in the first aspect. Therefore, for most explanatory descriptions, embodiments, and descriptions of beneficial effects of the second aspect, refer to related descriptions of the first aspect. The second aspect describes a case in which, in addition to the main subflow, a subflow is further established between at least one pair of matching local-end network interface card and peer-end IP address. Certainly, alternatively, besides the main subflow, no other subflow is established because there may be no matching local-end network interface card and peer-end IP address. In this case, the multipath connection can perform transmission by using only the main subflow.

In this way, in the method described in the second aspect, the first device determines the operator whose network is accessed by each of the at least one second network interface card of the local end and an operator corresponding to each of at least one IP address of a peer end; and establishes, through matching, preferentially or only a subflow between a network interface card and a peer-end IP address that correspond to a same operator. Considering impact of a plurality of operators supported by the multipath connection on an established subflow, for each established subflow, networks accessed by two end nodes of the subflow are homed to a same operator. This can better ensure transmission performance of the multipath connection, and also can better leverage an advantage of the multipath connection in transmission performance in comparison with a single-path connection.

A network interface card preferentially used by the first device currently is a network interface card preferentially used or currently used by default by the first device during current execution of the method, or may be the only network interface card that is of the first device and that is currently connected to a network. In other words, the network interface card preferentially used by the first device may vary with a setting, an actual network status, time, or the like.

There are a plurality of embodiments for establishing, by the first device, the at least one other subflow of the multipath connection based on the identifier of the operator whose network is accessed by each of the at least one second network interface card and the identifier of the operator corresponding to each of the at least one second IP address.

In one embodiment, each of the at least one second network interface card corresponds to an IP address of the first device. The first device determines at least one IP address pair by matching the identifier of the operator whose network is accessed by each of the at least one second network interface card and the identifier of the operator corresponding to each of the at least one second IP address, where an operator whose network is accessed by a second network interface card corresponding to an IP address of the first device in each of the at least one IP address pair is the same as an operator corresponding to a second IP address in the IP address pair; and the first device establishes only at least one other subflow that is in a one-to-one correspondence with the at least one IP address pair.

In one embodiment, the establishing, by the first device, at least one other subflow of the multipath connection based the identifier of the operator whose network is accessed by each of the at least one second network interface card and the identifier of the operator corresponding to each of the at least one second IP address includes: determining, by the first device by matching the identifier of the operator whose network is accessed by each of the at least one second network interface card and the identifier of the operator corresponding to each of the at least one second IP address, a second IP address accessed by each of the at least one second network interface card, where an operator corresponding to the second IP address corresponding to each of the at least one second network interface card is the same as the operator whose network is accessed by the second network interface card; and sending, by the first device by using the at least one second network interface card, a packet to the second IP address corresponding to each of the at least one second network interface card, to establish the at least one other subflow.

In one embodiment, the first device obtains at least one combination, where each of the at least one combination indicates a combination of one of the at least one second network interface card and one of the at least one second IP address; and if an operator whose network is accessed by the second network interface card indicated by each of the at least one combination is the same as an operator corresponding to the second IP address indicated by the combination, establishes one other subflow of the multipath connection by using the combination of the second network interface card and the second IP address; or if an operator whose network is accessed by the second network interface card indicated by each of the at least one combination is different from an operator corresponding to the second IP address indicated by the combination, prohibits establishment of a subflow of the multipath connection by using the combination of the second network interface card and the second IP address.

In one embodiment, the first device establishes at least one subflow based on the at least one second network interface card and the at least one second IP address, where the at least one subflow includes the at least one other subflow; and the first device removes, by matching the identifier of the operator whose network is accessed by each of the at least one second network interface card and the identifier of the operator corresponding to each of the at least one second IP address, a subflow that does not meet a requirement in the at least one subflow, where an operator whose network is accessed by a second network interface card used by the subflow that does not meet the requirement is different from an operator corresponding to a second IP address used by the subflow that does not meet the requirement.

According to a third aspect, this application describes a method, and the method is implemented in a second device. The method includes: sending, by the second device to a first device by using a first subflow, an IP address of the second device and an identifier of an operator corresponding to the IP address, where the first subflow is a subflow of a multipath connection between the first device and the second device; and communicating, by the second device, with the first device by using the IP address, to establish a second subflow of the multipath connection, where an operator whose network is accessed by the second subflow from the first device is the same as the operator corresponding to the IP address.

An operator accessed by the first subflow from the first device is the same as an operator accessed by the first subflow from the second device.

The second device may encapsulate the IP address of the second device and the identifier of the operator corresponding to the IP address into address notification signaling and send the address notification signaling to the first device, where the identifier of the operator corresponding to the IP address is carried in an extension field of the address notification signaling.

The third aspect describes a method implemented on a second device side in the first aspect or the second aspect. Therefore, for explanations of this aspect and descriptions of beneficial effects, refer to related paragraphs in the first aspect.

According to a fourth aspect, a subflow establishment apparatus is provided. The apparatus is located on a first device, and includes one or more modules configured to perform the method in the first aspect. Names and connection modes of these modules are not limited in this application. For example, the apparatus includes a configuration module and a multipath transmission protocol stack. For example, the two determining actions in the first aspect may be performed by the configuration module, and the subflow establishment action may be performed by the multipath transmission protocol stack. Alternatively, all the actions in the method according to the first aspect may be performed by the multipath transmission protocol stack. The determining an identifier of an operator whose network is accessed by each of a plurality of network interface cards of the first device may be: obtaining, by the multipath transmission protocol stack, the information from a protocol stack configuration at a transport layer. The determining a plurality of Internet Protocol (IP) addresses of a second device and an identifier of an operator corresponding to each of the plurality of IP addresses of the second device may be: obtaining, by the multipath transmission protocol stack, the information from a client of the first device or from the second device.

For the embodiments and term explanations of the fourth aspect, refer to related paragraphs in the first aspect.

According to a fifth aspect, a subflow establishment apparatus is provided. The apparatus is located on a first device, and includes one or more modules configured to perform the method in the second aspect. Names and connection modes of these modules are not limited in this application. For example, the determining action in the second aspect may be performed by a configuration module, and the subflow establishment and receiving actions may be performed by a multipath transmission protocol stack. Alternatively, all the actions in the method according to the second aspect may be performed by the multipath transmission protocol stack. The determining an identifier of an operator whose network is accessed by each of the at least one second network interface card of the first device may be: obtaining, by the multipath transmission protocol stack, the information from the configuration module. The receiving at least one second IP address of the second device and an identifier of an operator corresponding to each of the at least one second IP address of the second device may be performed by the multipath transmission protocol stack.

For the embodiments and term explanations of the fifth aspect, refer to related paragraphs in the second aspect.

According to a sixth aspect, a subflow establishment apparatus is provided. The apparatus is located on a second device, and includes one or more modules configured to perform the method in the third aspect. Names and connection modes of these modules are not limited in this application. For example, the method may be performed by a transceiver module and a multipath transmission protocol stack in the second device.

According to a seventh aspect, a device is provided. The device is configured to establish a subflow. The device includes a processing circuit, a communications interface, and a storage medium. The storage medium stores an instruction, the communications interface is configured to exchange information with another device according to the instruction delivered by the processing circuit, and the processing circuit is configured to run the instruction in the storage medium to implement the method described in the first aspect and the embodiments of the first aspect, the method described in the second aspect and the embodiments of the second aspect, or the method described in the third aspect and the embodiments of the third aspect.

It should be understood that the seventh aspect describes the device corresponding to any one of the first aspect to the third aspect. Various embodiments, descriptions, and technical effects thereof are not described herein again.

According to an eighth aspect, a computer program product is provided. The computer program product is configured to store program code that may implement the method in any one of the embodiments of either the first aspect or the third aspect, or configured to store program code that may implement the method in any one of the embodiments of the second aspect.

According to a ninth aspect, a computer-readable storage medium is provided, including an instruction. When the instruction is run on a computer, the computer is enabled to perform the method in any one of the embodiments of the first aspect, the method in any one of the embodiments of the second aspect, or the method in any one of the embodiments of the third aspect.

BRIEF DESCRIPTION OF DRAWINGS

To describe the technical solutions in this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

FIG. 6 is a schematic diagram of a format of address notification signaling according to this application;

DESCRIPTION OF EMBODIMENTS

This application provides a subflow establishment method, an apparatus, and a system. The following clearly describes the technical solutions in this application with reference to the accompanying drawings of this application. All other embodiments obtained by a person of ordinary skill in the art based on the embodiments of this application without creative efforts shall fall within the protection scope of this application.

It should be understood that various term explanations in this application are universally applicable to a plurality of embodiments. Explanations and descriptions of method embodiments in this application are universally applicable to other types of embodiments, such as apparatus, device, or computer program product embodiments.

An actual networking environment is relatively complex, and multipath transmission scenarios with more than two subflows are increasingly popular. There may be a plurality of operators in a region of a wide area network. Therefore, the region supports TCP data transmission on more than two subflows. For another example, in a data center, multipath TCP data transmission on three or more subflows may also be supported by using an equal-cost multipath routing (ECMP) technology. Actually, using all subflows of an MP connection to transmit data cannot always achieve optimal transmission performance.

Currently, a common multipath subflow establishment method is to configure a fullmesh option of a kernel, so that a device supports one connection corresponding to a plurality of paths. In this way, a subflow may be established between each active Internet protocol (IP) address of a local end and each active IP address of a peer end. This mode may be referred to as a fullmesh mechanism for short. In this mechanism, a subflow is established for each available IP address pair. For example, even if only two types of networks (such as LTE and Wi-Fi) are used between the local end and the peer end, 2×2=4 subflows are established.

Figure 1:
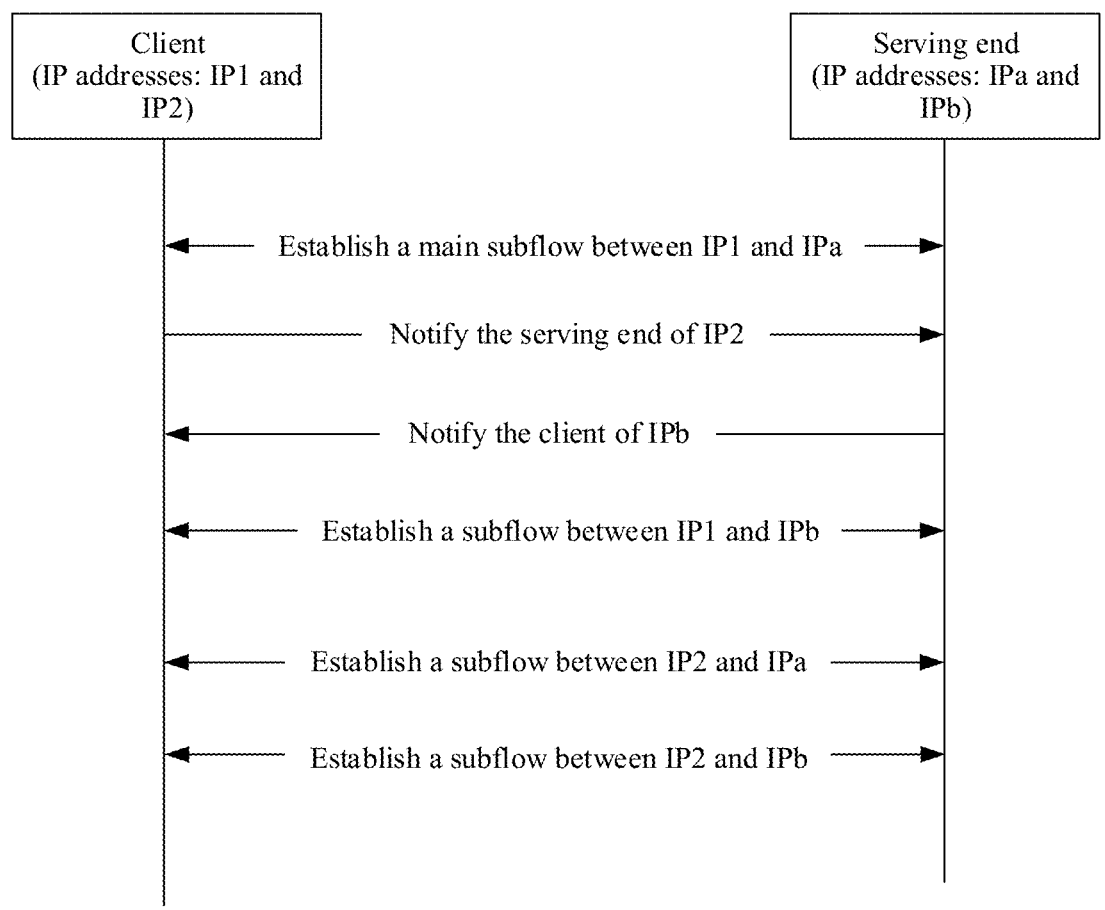
FIG. 1 is a schematic flowchart of an existing subflow establishment method.

When two end devices each have network interface cards homed to different operators, establishing subflows by using the existing fullmesh mechanism cannot bring expected performance gains. In a current network environment, it is highly possible that a plurality of network interface cards of a terminal are homed to different operators. For example, a network interface card configured to access Wi-Fi is connected to a China Telecom network, and a network interface card configured to access LTE is connected to a China Mobile network (CMCC). In a common approach of internet service providers in China, a server side provides different IP addresses for a mobile terminal that is connected to different operators. In other words, a terminal supporting both Wi-Fi and LTE are also assigned different IP address. FIG. 1 shows a subflow establishment process after the fullmesh mechanism is configured. (IP1, IPa) are IP addresses of two ends of a subflow homed to China Telecom, and (IP2, IPb) are IP addresses of two ends of a subflow homed to China Mobile. In the fullmesh mechanism, by default, this pair of devices transmits data by using Wi-Fi.

In one embodiment, a client establishes a main subflow, namely, a subflow 1, to an IP address IPa of a server by using a network interface card whose corresponding IP address is IP1 and that is used by a current default route. In other words, in a multipath transmission technology, a device on which the client is located has a current default network interface card that is alternatively referred to as a network interface card preferentially used currently; and the client establishes a single-path connection by using the current default network interface card. A current network interface card is a network interface card used by default by the device on which the client is located when establishing a multipath connection shown in FIG. 1. In other words, a network interface card used by default by a device may vary with a configuration or a network environment in which the device is located. There is a definite correspondence between a network interface card and a local-end IP address. In other words, the client has a local-end IP address currently used by default (or preferentially used). The device (such as a terminal) establishes a subflow to a serving end by using the current default IP address. On the subflow, an IP address of the serving end and the IP address used by default belong to a same operator.

In a subflow establishment process described in this application, a subflow is used to transmit data. Before this, the client and the serving end may also communicate with each other. Before the subflow is established, the client may notify, by using the default network interface card, the serving end of a default operator used by the client to perform communication. The serving end returns an IP address of the serving end, where an operator to which the IP address is homed is the same as the operator whose network is accessed by the default network interface card of the device on which the client is located. Therefore, when establishing the main subflow, the client already knows the IP address of the serving end, and the established main subflow does not cross operators.

Next, the client and the serving end notify each other of all other available IP addresses of the client and the serving end by using the established main subflow. In one embodiment, the client notifies the serving end of the IP address IP2, and the serving end notifies the client of the IP address IPb. The two actions of notifying each other of the IP addresses may be performed at the same time, or either of the two actions may be performed first. Then, the client establishes, from each local available network interface card, a subflow establishment process to each IP address notified by the serving end. In one embodiment, the client and the serving end establish a subflow 2, a subflow 3, and a subflow 4 respectively by using the IP address pairs IP1 and IPb, IP2 and IPa, and IP2 and IPb. A sequence of establishing the three subflows is not limited. For example, the three subflows may be established in parallel. FIG. 1 is merely used as an example for description, and does not limit a sequence of operations.

Figure 2:
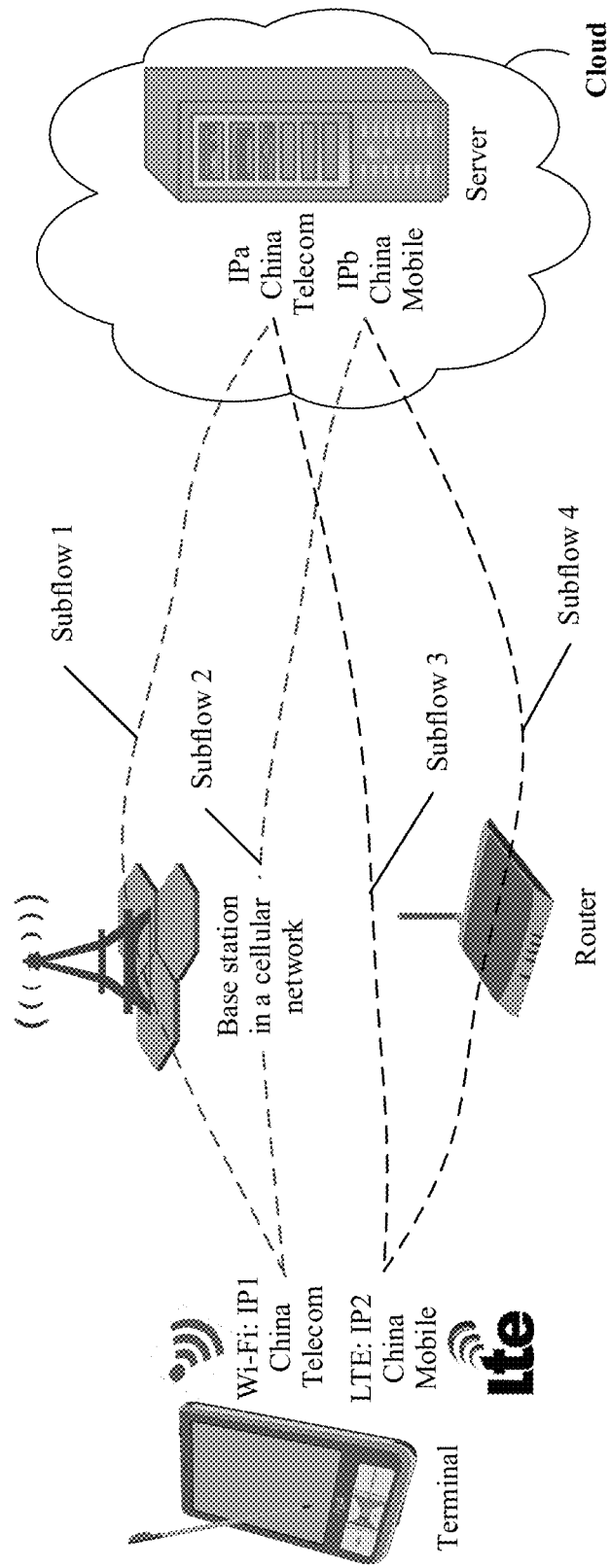
FIG. 2 is a schematic diagram of multi-subflow communication between a terminal and a server according to this application.

FIG. 2 illustrates a network topology of the plurality of subflows described in FIG. 1. A client is located on a terminal, and the terminal has two IP addresses. A serving end is located on a server, the server is located in a cloud, and the server also has two IP addresses. Four subflows are established by using a Wi-Fi network and a cellular network. FIG. 2 further illustrates a base station in the cellular network and a router the Wi-Fi network.

In the figure, a subflow 1 and a subflow 4 are subflow connections between IP addresses of a same operator, and a subflow 2 and a subflow 3 are subflow connections between IP addresses of different operators.

FIG. 2 shows access nodes of different networks. An access node particularly means an access node of a wireless network. The access node may be an access point (AP) or a router in the Wi-Fi network, an access point in a WiMax network, a base station in a wireless cellular mobile network, or the like. A type of the wireless network and a form of the access node in the wireless network are not limited in this application. In addition, access nodes of a same type are access nodes all belonging to the wireless Wi-Fi network, access nodes all belonging to the WiMax network, or access nodes all belonging to a wireless cellular network such as a 2G network, a 3G network, a 4G network, or a 5G network.

In the network topology illustrated in FIG. 2, the subflow 2 and the subflow 3 have higher data transmission latencies than the subflow 1 and the subflow 4, and have a relatively high probability of packet loss. Therefore, in a scenario in which multipath parallel transmission is performed to improve throughput performance, it is highly probable that introducing the subflow 2 and the subflow 3 will have negative effects. In a scenario in which multipath packet redundancy transmission is performed to improve latency and reliability performance, introducing the subflow 2 and the subflow 3 produces no obvious improvement, but leads to higher bandwidth traffic overheads at the client and the serving end. In addition, when the serving end is the server, in an actual scenario, the server needs to provide services for hundreds or thousands of clients. Moreover, due to complexity of actual networking, one server usually corresponds to more than two IP addresses, and there are also hundreds or thousands of subflows that make no obvious improvement to transmission performance, which impose heavy burden on the server and also waste network resources.

It can be learned that although the four subflows are established between the client and the serving end, transmission performance is not much higher than that when two subflows are established selectively, and in comparison with a case in which only the subflow 1 and the subflow 4 are used, some performance indicators are even degraded.

A subflow establishment method proposed in this application is to selectively establish subflows in a process of establishing a plurality of subflows of an MP connection, to ensure transmission performance.

The following explains some terms in this application.

A and/or B: represents A and B, or A or B.

Multipath connection: a plurality of subflows that are between two hosts (host) and that can be used to perform communication over an application. A host is an end node of a multipath connection. The host runs an application. The multipath connection one-to-one corresponds to a socket of the application. A link that is between two hosts and that can be used to perform communication over an application may also be referred to as a connection, except that an MP connection includes a plurality of paths, and a common connection has only one path. The two hosts usually run on two physical machines.

In this application, an application may be deployed on a network device (such as a server, a gateway, or a proxy server), and may also be deployed on a terminal.

Path: A path is a link between a transmit end (sender) and a receive end (receiver). The path may be identified by using a four-tuple or a five-tuple. For example, the five-tuple includes a source IP address, a source port number, a destination IP address, a destination port number, and a transport layer protocol name. A plurality of paths between a pair of receive end and transmit end may share one or more routers.

Subflow: a flow running on a single path. A subflow is a part of a multipath connection. In a multipath transmission technology, a subflow may use a plurality of common single-flow transmission protocols, for example, Transmission Control Protocol (TCP), User Datagram Protocol (UDP), Stream Control Transmission Protocol (SCTP), or Quick UDP Internet Connections (QUIC). A single subflow is controlled by using a transmission protocol corresponding to the subflow.

In this application, a non-cross-operator subflow means that networks accessed by two ends of the subflow, that is, a network accessed by a client and a network accessed by a serving end, are networks provided by a same operator. It should be noted that if on a subflow, a network accessed by a client is provided by an operator A located at a place A, and a network accessed by a serving end is provided by the operator A located at a place B, it is considered that the subflow does not cross operators. If on a subflow, a network accessed by a client is a network A (such as LTE) provided by an operator A located at a place A, and a network accessed by a serving end is a network B (such as 3G or Wi-Fi) provided by the operator A located at a place B, it is also considered that the subflow does not cross operators. On the contrary, if networks accessed by two ends of a subflow are networks provided by different operators, the subflow crosses operators.

A network interface card (NIC) may also be referred to as a network interface card controller or a network interface controller, and is referred to as a network card for short. The network interface card mentioned in this application is a physical network interface card, or may be a virtual network interface card virtualized from a physical network interface card. A physical network interface card is a piece of hardware designed to allow a physical machine or another device to access a network to communicate with another network element. For a connection, when a physical node on the connection accesses a network by using a network interface card, a correspondence between the network interface card of the physical node and a provider of the network accessed by the physical node, namely, a network provider, is definite. Further, on the connection, if the physical node already knows the network interface card used for accessing the network, the physical node may also determine an IP address of the physical node used on the connection. In this application, an operator corresponding to a network interface card is an operator of a network accessed by using the network interface card, and therefore is also referred to as an operator whose network is accessed by a network interface card.

For related content about a host, a path, a link, and a subflow, refer to the document RFC.6824 of the IETF standardization group.

In this application, a device on which a client is located is a local-end device, and is referred to as a local end for short. A device on which a serving end is located is a peer-end device, and is referred to as a peer end for short. FIG. 2 shows a common scenario in which a local end is the terminal and a peer end is the server. The technical solutions recorded in this application may also be applied to a cloud-to-cloud communication scenario and an end-to-end communication scenario.

The multipath transmission technology may be applied to a plurality of networking systems. Generally, if information needs to be transferred by using the multipath transmission technology, there needs to be at least one link supporting the multipath transmission technology between a transmit end and a receive end of the information. The plurality of networking systems can support terminal-to-terminal communication, cloud-to-cloud communication, or cloud-to-terminal communication. The method described in this application may be performed by an end node of a multipath transmission connection. The end node may be located on an end device that supports the multipath transmission technology. If an end device at an end does not support multipath transmission, to transfer a packet by using the multipath transmission technology, a proxy device that supports the multipath transmission technology may be used. The technical solutions of this application are applied to the proxy device that supports the multipath transmission technology. The technical solutions of this application are applied to a cloud-based device that supports a multipath transmission protocol, such as a server; a terminal that supports the multipath transmission protocol, such as a desktop computer, a notebook computer, a tablet computer, a cellular phone, a smart watch, a smartphone, or a PDA; and a network element that supports the multipath transmission protocol, such as a gateway, an access router, a core router, a front-end router, or a load balancer.

Figure 3:
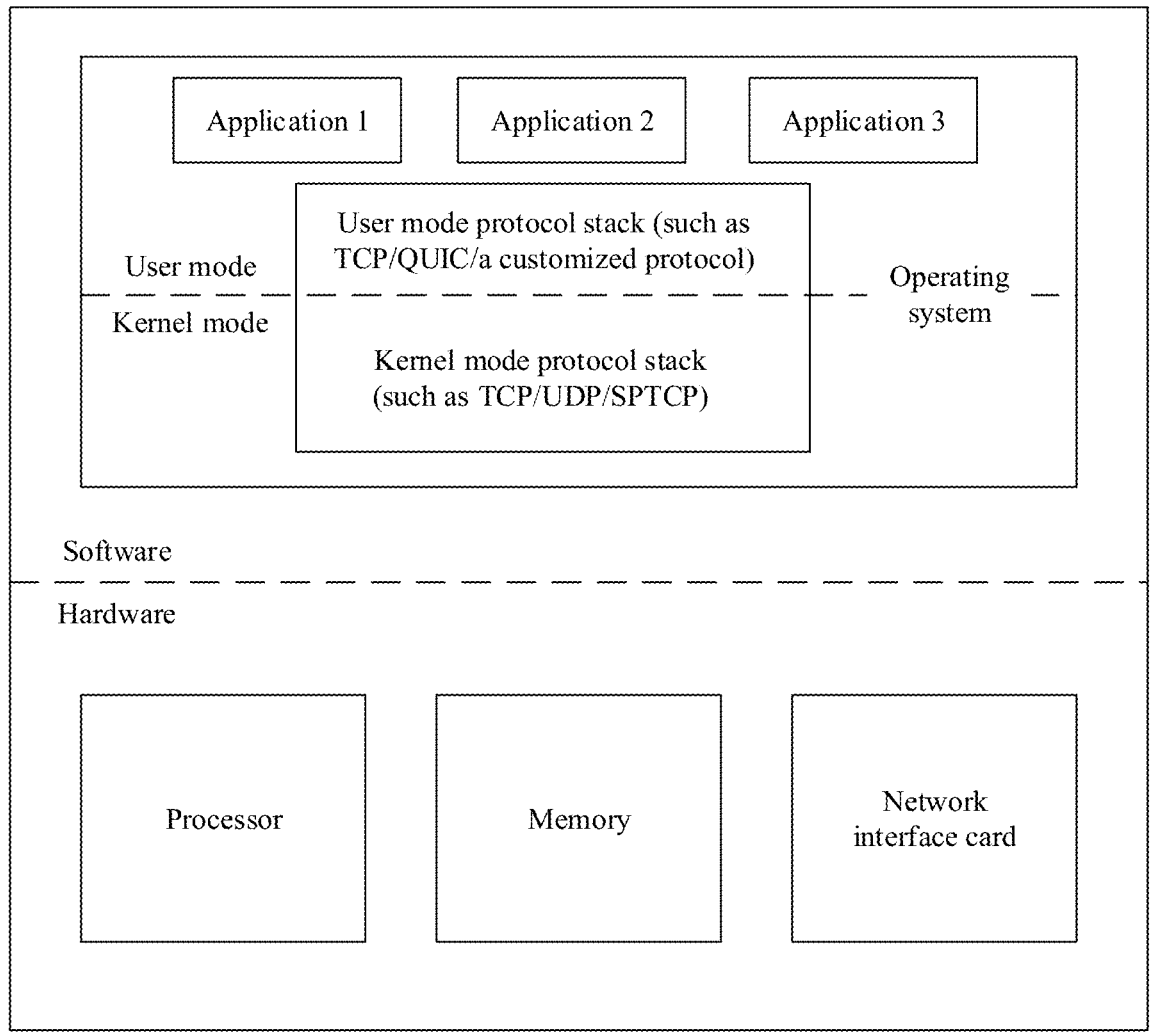
FIG. 3 is an architectural diagram of software and hardware of a device according to this application.

FIG. 3 is a schematic architectural diagram of a device. Hardware of the device includes various hardware components or apparatuses, such as a memory, a processor, and a network interface card for network interconnection. There may be one or more network interface cards. If there is one network interface card, a plurality of network interface cards are obtained through virtualization by using a network interface card virtualization technology, to support a plurality of types of networks. If there are a plurality of network interface cards, each network interface card may support one type of network, or the network interface card virtualization technology may be applied to at least one of the network interface cards. For example, a terminal has different network interface cards that are respectively configured to connect to a cellular network and Wi-Fi network. For another example, a terminal supports two mobile communication numbers. For example, two SIM cards may be installed on the terminal at the same time, and the terminal can use the two cellular networks to perform multipath transmission. In this case, different network interface cards are used for the two mobile communication numbers. Software of the device includes an operating system and an application (such as an application A, an application B, or an application C) that runs in a user mode of the operating system. The operating system includes a kernel mode and the user mode. The figure illustrates some example single-flow user mode protocols and kernel mode protocols. These protocols may be used to control a subflow of a multipath connection. Locations of different protocols are also slightly different. For example, UDP or a stream control transmission protocol (STCP) is a kernel mode protocol, a quick UDP internet connection (QUIC) protocol and some private protocols are user mode protocols, and a TCP protocol crosses the kernel mode and the user mode. From a perspective of the operating system, multipath transmission corresponds to both a kernel mode protocol and a user mode protocol.

The method described in this application may be stored in the memory in FIG. 3 in a form of code, and is invoked by the processor to be implemented in software, such as a network layer, a transport layer, and an application layer of a protocol stack.

Figure 4:
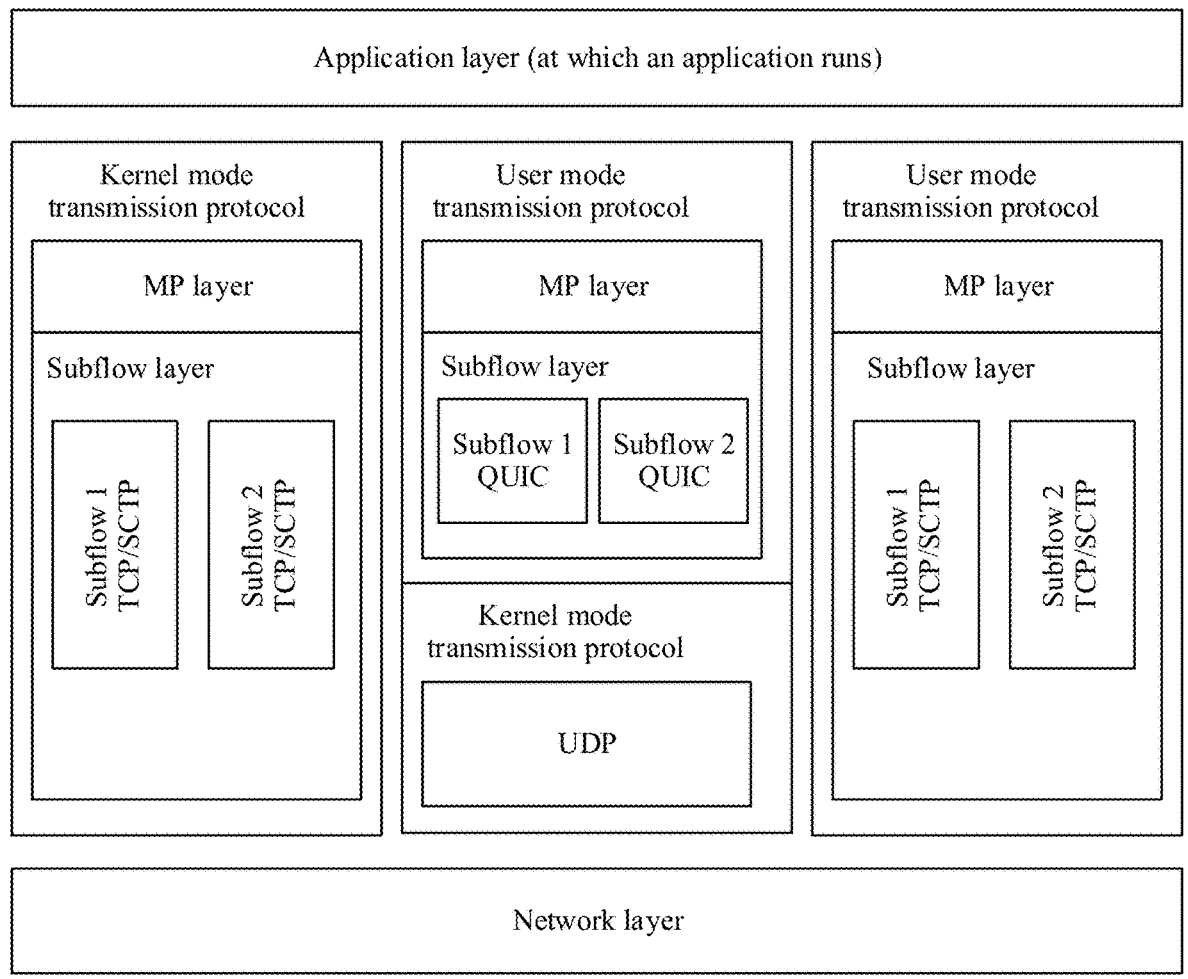
FIG. 4 is an architectural diagram of software of a device according to this application.

The protocol stack may include a physical layer, a data link layer, the network layer, the transport layer, and the application layer, which are configured to implement protocols of the layers. FIG. 4 describes relative locations of various protocols in this application from a perspective of a protocol stack. FIG. 4 includes a network layer, a transport layer, and an application layer. A multipath transmission protocol layer may be considered as being located at the transport layer, and therefore is also referred to as a multipath transport layer, which replaces currently common transport layer protocols. The multipath transmission protocol layer includes an MP layer that is used to control a whole multipath connection and a subflow layer that controls a subflow. The foregoing various protocols may be used for each subflow layer. There are only kernel mode multipath transmission protocols, only user mode multipath transmission protocols, or both kernel mode multipath transmission protocols and user mode multipath transmission protocols. The network layer includes an IP protocol and is also referred to as an IP layer. An IP address described in this application may be obtained by the network layer. However, an operator identifier described in this application may be obtained from the network layer or a lower layer. Various applications run at the APP layer that corresponds to the user mode in FIG. 3. It can be learned that FIG. 4 is described from a perspective of an internet protocol stack, and depicts the top three layers that are more highly associated with the method described in this application but does not depict a data link layer or a physical layer. The hardware in FIG. 3 may be considered as being corresponding to the physical layer. The application layer and the transport layer may communicate with each other by using a standard Socket interface (standard Socket API). FIG. 4 illustrates three embodiments of a multipath transport layer. In each embodiment, an MP layer and a subflow layer are included, where a multipath transmission protocol runs at the MP layer and two subflows are illustratively depicted at the subflow layer. The device in FIG. 3 may include any one of the three multipath transport layers. In addition, three embodiments of each of the application layer and the IP layer are similar to the three embodiments of the transport layer, and therefore are not described separately. In the figure, the left portion illustrates a kernel mode multipath transport layer, where a subflow thereof uses a TCP/SCTP protocol; the middle portion illustrates a user mode MP layer, where a subflow thereof uses a QUIC protocol and a kernel mode transmission protocol uses a UDP protocol; and the right portion illustrates a user mode multipath transport layer, where a subflow thereof uses a TCP/SCTP protocol.

In view of the foregoing scenario and problem, this application describes a subflow establishment method. The following descriptions are provided by using an example in which an end that establishes a subflow is a client. For example, the client runs on a terminal. In this method, a protocol stack of a local end obtains an identifier of an operator corresponding to a network interface card of the local end; obtains an identifier of an operator to which an IP address of a peer-end device is homed, where the peer-end device is a device for which a connection is to be established; and selects a suitable IP address pair by matching the identifiers of the operators, to establish a subflow. In an embodiment, the protocol stack is a protocol stack located in a kernel.

Identifiers of operators are used to distinguish between different operators. A representation form is not limited in this application. For ease of description, an identifier of an operator is referred to as an operator identifier below. For example, the operator identifier may be a name of an operator such as China Telecom, a serial number, a flag bit, a name of a network provided by the operator such as LTE, another parameter that can be used to distinguish between operators, or another data structure that can be used to distinguish between operators.

An identifier of an operator whose network is accessed by a network interface card may be referred to as an operator identifier corresponding to the network interface card or an operator identifier of the network interface card in the following description.

A correspondence between an IP address and an operator corresponding to the IP address essentially indicates an operator that provides a network accessed by using the IP address. In other words, in an embodiment, an operator corresponding to an IP address is an operator to which the IP address is homed. However, another similar relationship may also be applicable. This is not limited in this application. For example, some IP addresses are just IP addresses of a private network or temporary IP addresses, and it is possible that the IP address is not homed to an operator. Then, an operator identifier corresponding to this type of IP address or an operator identifier of the IP address is interpreted as being the same as an identifier of an operator whose network is accessed by a network interface card corresponding to the IP address. An identifier of an operator to which an IP address is homed may be referred to as an operator identifier corresponding to the IP address or an operator identifier of the IP address in the following description.

It should be further noted that devices at two ends of a subflow may use operator identifiers in different representation forms to represent a same operator. For example, on a subflow, a device on which a client is located uses a serial number to represent an operator, and a device on which a serving end is located uses an operator name to represent the operator.

Similarly, a representation form of a network interface card identifier (that is, an identifier of a network interface card) mentioned below is not limited either, provided that different network interface cards on the device on which a client is located can be distinguished. The network interface card may be a virtual network interface card or a physical network interface card. For details, refer to descriptions of the operator identifier. For example, a name or a serial number of a subscriber identity module (SIM) card of a mobile phone may also be used as a network interface card identifier. An application identifier mentioned in the following is used to identify an application, and a service identifier is used to identify a service. The application identifier and the service identifier may also be names, serial numbers, or the like. For example, an application identifier may be an identifier of an enterprise or company corresponding to an application. Forms of the application identifier and the service identifier are not limited in this application.

It should be noted that one operator may provide a plurality of types of networks. In some embodiments, in the method described in this application, a subflow is not necessarily established between networks of a same type provided by a same operator. In other words, when a subflow is established by using the method described in this application, IP addresses at two ends may belong to a same operator but belong to networks of different types. Certainly, in some other embodiments, a subflow establishment rule is stricter, and a subflow is established for only an IP address pair that belongs to networks of a same type and of a same operator.

The following describes a subflow establishment method. The method is implemented between two end devices of a connection. The method includes the following operations.

S501: A protocol stack of a local-end device obtains local-end information and peer-end information.

The local-end information includes an operator identifier corresponding to each of a plurality of network interface cards of the local-end device. The peer-end information includes a plurality of IP addresses of a peer-end device and an identifier of an operator to which each of the plurality of IP addresses is homed.

Alternatively, the local-end information includes an identifier of a network interface card preferentially used, identifiers of other network interface cards of the local-end device that are different from the network interface card preferentially used, and an identifier of an operator corresponding to each of the other network interface cards. The peer-end information includes an IP address that is of the peer-end device and that corresponds to the network interface card preferentially used, other IP addresses different from the IP address that corresponds to the network interface card preferentially used, and an identifier of an operator to which each of the other IP addresses is homed. There may be one or more other IP addresses, and there may also be one or more other network interface cards. An IP address pair of a main subflow may be determined by using the prior art. Therefore, during establishment of a plurality of subflows in a process of this method, only other IP address pairs that may be used for subflow establishment need to be obtained. In many scenarios, each IP address of a device is homed to a different operator. In this way, operator identifiers corresponding to the main subflow are no longer needed.

The local-end device first obtains the local-end information, or may first obtain the peer-end information. This is not limited.

A protocol stack of a transport layer of the local-end device obtains the local-end information and the peer-end information. The protocol stack may save the foregoing obtained local-end information and peer-end information.

The protocol stack of the local-end device obtains the network interface card identifiers and the operator identifiers of the local-end device from a network layer of the local-end device. After detecting an operator whose network is accessed by each of the plurality of network interface cards of the local end, a module at the network layer (such as a configuration module 2 at the network layer) may report correspondences between the identifiers of the network interface cards (referred to as the network interface card identifiers for short) and the operator identifiers to the transport layer. Alternatively, the protocol stack of the transport layer may proactively obtain correspondences between the identifiers of the network interface cards and the operator identifiers from an underlying layer. The plurality of network interface cards include at least one of a virtual network interface card and a physical network interface card.

The protocol stack may first determine, based on the correspondences between the network interface card identifiers and the operator identifiers, an operator to which each of a plurality of IP addresses of the local-end device is homed; and then establish, based on the plurality of IP addresses that are of the local end and whose corresponding operators are already known and based on the plurality of IP addresses that are of the peer end and whose corresponding operators are already known, a subflow between an IP address of a client and an IP address of a serving end that belong to a same operator. Alternatively, a to-be-established subflow may be determined directly based on the correspondences between the network interface card identifiers and the operator identifiers of the local end and correspondences between the IP addresses and the operator identifiers of the peer end.

There is a clear mapping relationship between a network interface card and an IP address, and the local-end device sends and receives a packet by using a network interface card. Therefore, the local-end device on which the client is located may also obtain a correspondence between an operator identifier and another parameter that can be used to determine an IP address. The local-end device may determine, by querying a correspondence that is between the parameter and the IP address and that is stored in the local-end device, a mapping relationships between the IP address and the operator identifier.

The plurality of IP addresses of the peer-end device and the identifier of the operator to which each of the plurality of IP addresses is homed that are obtained by the protocol stack of the local-end device may be mapping relationships between the IP addresses and the operator identifiers.

Figure 5A:
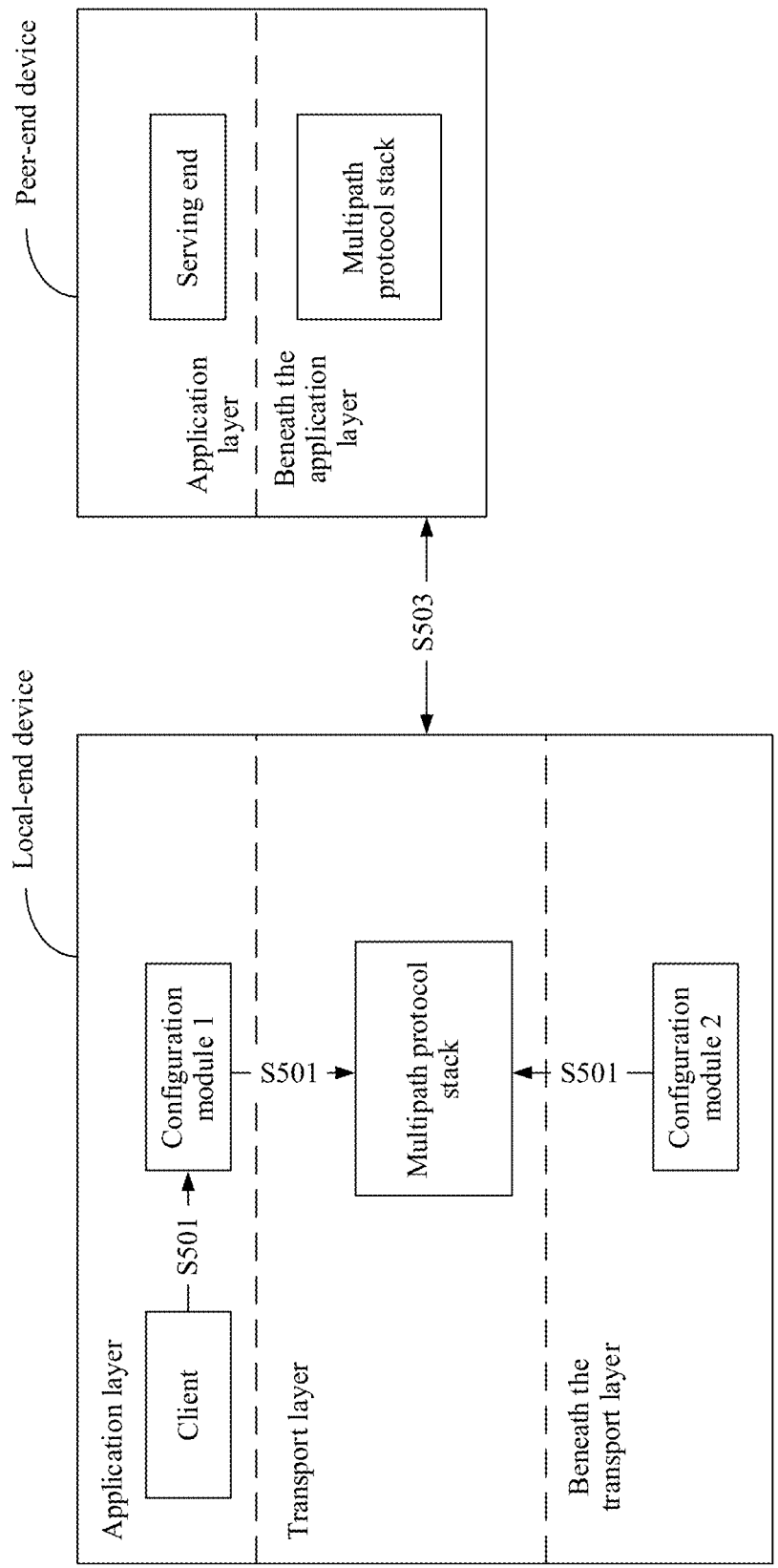
FIG. 5a is a schematic diagram of a subflow establishment method according to this application.

In one embodiment, the IP addresses used by the main subflow, the operator identifiers corresponding to the IP addresses, and mapping relationships between the other IP addresses and the operator identifiers of the peer-end device may be sent to the client of the local-end device in advance by the peer-end device, and are obtained from the client of the local-end device by the protocol stack of the local-end device when starting to perform S501. For example, after a configuration module 1 located at an application layer obtains mapping relationships of a plurality of pairs of IP addresses and operator identifiers from the client, a multipath transmission protocol stack may obtain the mapping relationships from the configuration module 1, or the configuration module 1 may deliver the mapping relationships to the multipath transmission protocol stack. Then, in S503, the main subflow and another subflow are established, where IP addresses at two ends of the another subflow are homed to a same operator. FIG. 5a illustrates such an embodiment. FIG. 5a further indicates that in S501, the multipath transmission protocol stack obtains the correspondences between the identifiers of the network interface cards and the operator identifiers of the local end from the configuration module 2. The configuration module 2 is located beneath the transport layer. Both the configuration module 1 and the configuration module 2 are software modules. In another case, the client may establish the main subflow to the serving end in a process of performing S501, another subflow different from the main subflow is established in S503. In other words, after learning the IP address pair for establishing the main subflow, the multipath transmission protocol stack first establishes the main subflow, and then collects other information. Establishment time of the main subflow is relatively flexible.

Figure 5B:
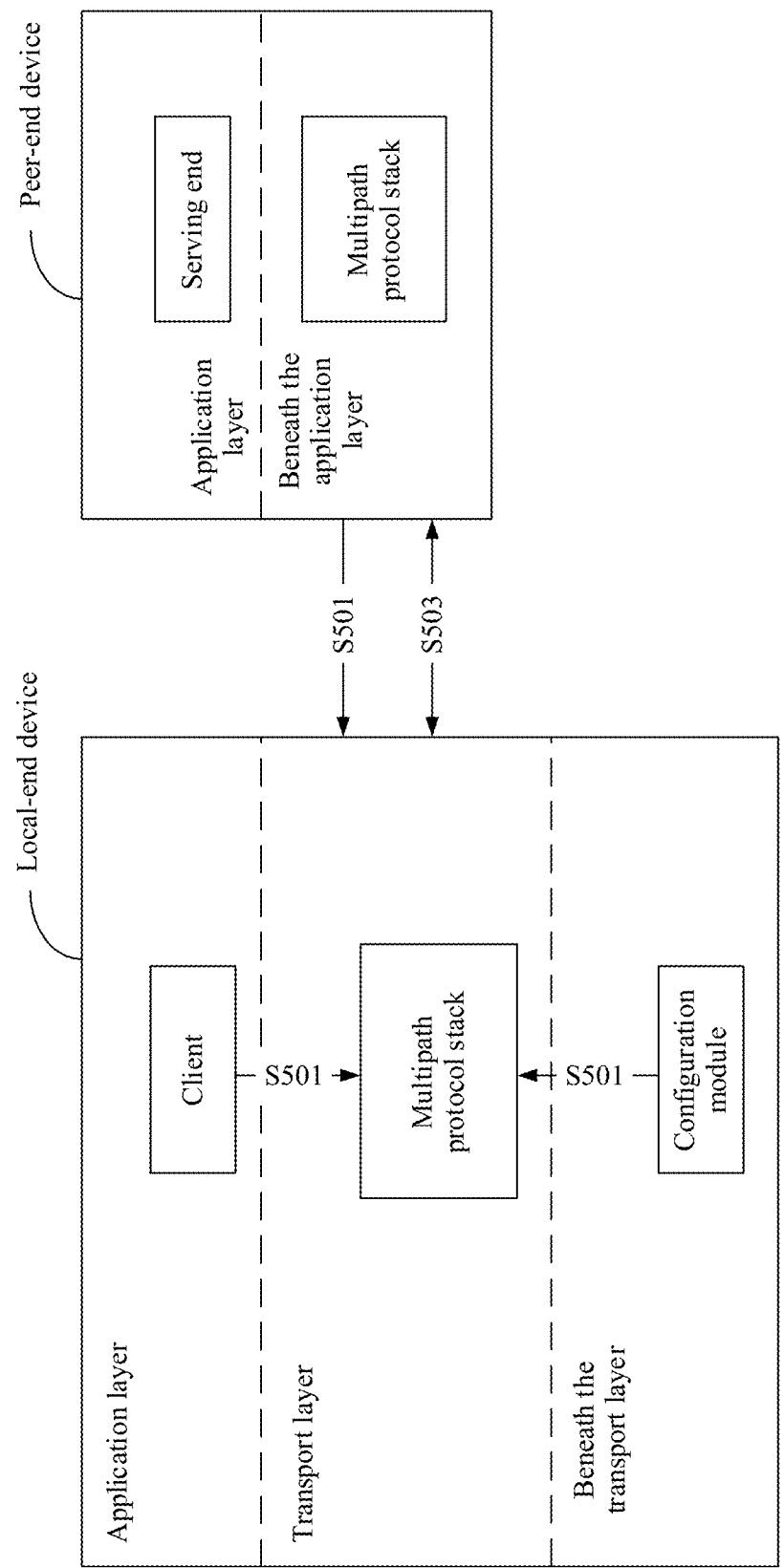
FIG. 5b is a schematic diagram of a subflow establishment method according to this application.

Alternatively, the IP addresses used by the main subflow are sent to the local-end device in advance by the peer-end device. After the local-end device establishes the main subflow, the peer-end device sends mapping relationships between the other IP addresses and the operator identifiers to the local-end device by using the main subflow. In this embodiment, S501 further includes a process of establishing the main subflow, and another subflow different from the main subflow is established in S503. FIG. 5b illustrates such an embodiment. In S501, the multipath transmission protocol stack of the local-end device obtains, from the peer-end device, the mapping relationships between the other IP addresses and the operator identifiers. The IP addresses corresponding to the main subflow have been sent to the local-end device in advance. Therefore, the client of the local-end device delivers the IP addresses of the main subflow to the multipath transmission protocol stack. The multipath transmission protocol stack of the local-end device obtains, from a configuration module, the correspondences between the identifiers of the network interface cards and the operator identifiers of the local end. Then, in S503, another subflow that is different from the main subflow and that is homed to a same operator is established. That S501 further includes a process of establishing the main subflow is not illustrated in FIG. 5b. The configuration module is located beneath the transport layer.

Certainly, alternatively, the foregoing information exchanged between the application layer and the multipath transmission protocol stack may be directly delivered to the multipath transmission protocol stack by the client. This is not illustrated with an accompanying drawing in this application.

The peer-end device may send the mapping relationships between the other IP addresses and the operator identifiers to the local-end device by using address notification signaling shown in FIG. 6. An IP address field of the address notification signaling carries the other IP addresses different from the IP addresses of the main subflow, and the identifiers of the operators to which the other IP addresses are homed are carried by using a customized operation information field. In this way, there is no need to define a new instruction, and an existing communications protocol is slightly modified. FIG. 6 illustrates general address notification signaling. The first row is only used to represent lengths of four octets, and is not included in the address notification signaling. In FIG. 6, fields included in the address notification signaling start from a kind field and end with the operation information field. A length of the operation information field may be greater than two octets, and FIG. 6 just illustrates a location of the operation information field.

In an existing full mesh mechanism, two communication parties use this signaling to notify each other of their respective IP addresses. An octet represents an 8-bit length, that is, a set of 8-bit data, similar to a byte. The operation information field is an optional field. Different IP protocols correspond to different IP address lengths. In existing address notification signaling, the operation information field is empty, or carries other information and does not carry an operator identifier.

S503: The local-end device establishes a subflow for an IP address pair that belongs to a same operator.

In one embodiment, before S503, the method may include S502a: The local-end device matches the operators corresponding to the plurality of network interface cards of the local-end device and the operators to which the plurality of IP addresses of the peer-end device are homed. Certainly, the operators corresponding to the plurality of network interface cards of the local end are the operators to which the plurality of IP addresses of the local-end device are homed. In one embodiment, before S503, the method may include S502b: The local-end device matches operators corresponding to other network interface cards of the local-end device that are different from a network interface card of the main subflow and operators to which other IP addresses of the peer-end device that are different from the IP address of the main subflow are homed.

The protocol stack of the local-end device establishes at least one subflow based on the operator corresponding to each of the plurality of IP addresses of the local end and the operator corresponding to each of the plurality of IP addresses of the peer end. Alternatively, the protocol stack establishes at least one subflow based on the operator corresponding to each network interface card identifier of the local end and the operator corresponding to each IP address of the peer end. In one embodiment, in this process, the local-end device first establishes all subflows and then terminates a subflow whose IP addresses at two ends are homed to different operators. In one embodiment, in this process, IP address pairs for which subflow establishment is allowed are first determined, and only subflows corresponding to these IP address pairs are established. The local end may store some matching rules. For example, a subflow is established only between an IP address of the client and an IP address of the serving end that are homed to networks provided by a same operator, and no subflow is established between IP addresses that are not homed to a same operator. For example, a subflow whose IP addresses at two ends are homed to different operators is terminated.

The matching and flow establishment logic for establishing a subflow for an IP address pair belonging to a same operator may be considered as being implemented by a module newly added to the multipath transmission protocol stack. The module is essentially a segment of code newly added to the multipath transmission protocol stack. The module may also be referred to as a path management module. When the multipath transmission protocol stack establishes a subflow, the path management module may be used to prevent establishment of a subflow for an IP address pair that does not belong to a same operator, thereby ensuring transmission performance. The path management module is not illustrated in FIG. 5a and FIG. 5b.

When the local end obtains the peer-end information from the peer end, an embodiment of S501 may further include the process of establishing the main subflow. When the local end obtains the local-end information, in the embodiment in which the local end obtains the plurality of peer-end IP addresses from the application layer, it may be considered that the process of establishing the main subflow is included in S503. For the process of establishing the main subflow, refer to the foregoing descriptions or a solution in an existing multipath transmission technology. The main subflow is a subflow established by the local-end device by using a default network interface card of the local end and a peer-end IP address that corresponds to a same operator as that of the default network interface card.

In this way, a subflow is established for a proper IP address pair selected by matching the identifiers of the operators. This prevents negative impact of cross-operator communication of some subflows on transmission performance of a multipath connection, thereby better leveraging an advantage of the multipath connection in transmission performance in comparison with a single-path connection. In comparison with a case in which subflows are established for all possible IP address pairs, a quantity of subflows maintained by the local end and the peer end is reduced, and therefore burden on the devices and a network is reduced.

The following further describes the peer-end device information obtained by the local-end device in S501, that is, the plurality of IP addresses of the peer-end device and the operator to which each of the plurality of IP addresses is homed.

A server may run data of various applications. Some big companies have a plurality of applications. For example, Google has a plurality of applications such as Google Maps and Google Search. Tencent has various game applications, Tencent Video, WeChat, QQ Music, and the like. Applications of a same company may share a server. As cloud platforms and cloud services emerge, a server may run a plurality of applications of different companies. In other words, a server may function as a serving end of a plurality of applications, and some applications may share some IP addresses. One application may include modules configured to implement different services, and different modules may correspond to different IP addresses. Therefore, one application may correspond to a plurality of peer-end IP addresses, and one peer-end IP address may also be reused by a plurality of applications.

A local end may obtain all available IP addresses of a peer-end device and an identifier of an operator to which each of these IP addresses is homed. In other words, a server sends all the IP addresses and identifiers of operators corresponding to the IP addresses to a terminal, without distinguishing between IP addresses corresponding to applications on the server. The local end may obtain only an IP address that is of the peer-end device and that corresponds to an application for which a subflow needs to be established, and an identifier of an operator corresponding to the IP address. The server may send a mapping relationship between an application, an IP address of the server, and an identifier of an operator, for example, a mapping relationship between an application identifier, the IP address, and the identifier of the operator. Certainly, alternatively, a mapping relationship may be more complex and dynamic, for example, may be a mapping relationship between a service identifier, an application identifier, an IP address, and an operator identifier. A service is a service to be carried on a to-be-established subflow. A form of information sent to the local end by the peer end is not limited in this application. A mapping relationship between more parameters may also be applicable, but the mapping relationship includes a mapping between an IP address and an operator identifier. After receiving the information, an application of the local end may process the information. Finally, a protocol stack of the local end obtains at least the mapping between an IP address and an operator identifier. Table 1 illustrates content included in a mapping relationship obtained by the protocol stack in an embodiment, where an application name is game 1.

TABLE 1

| Application name | Operator name | IP address |
| --- | --- | --- |
| Game 1 | China Mobile | IPa |
|  | China Unicorn | IPb |

TABLE 1-continued

| Application name | Operator name | IP address |
| --- | --- | --- |
|  | China Telecom | IPc |
|  | China TieTong | IPd |
|  | Another operator | IPe |

Figure 7:
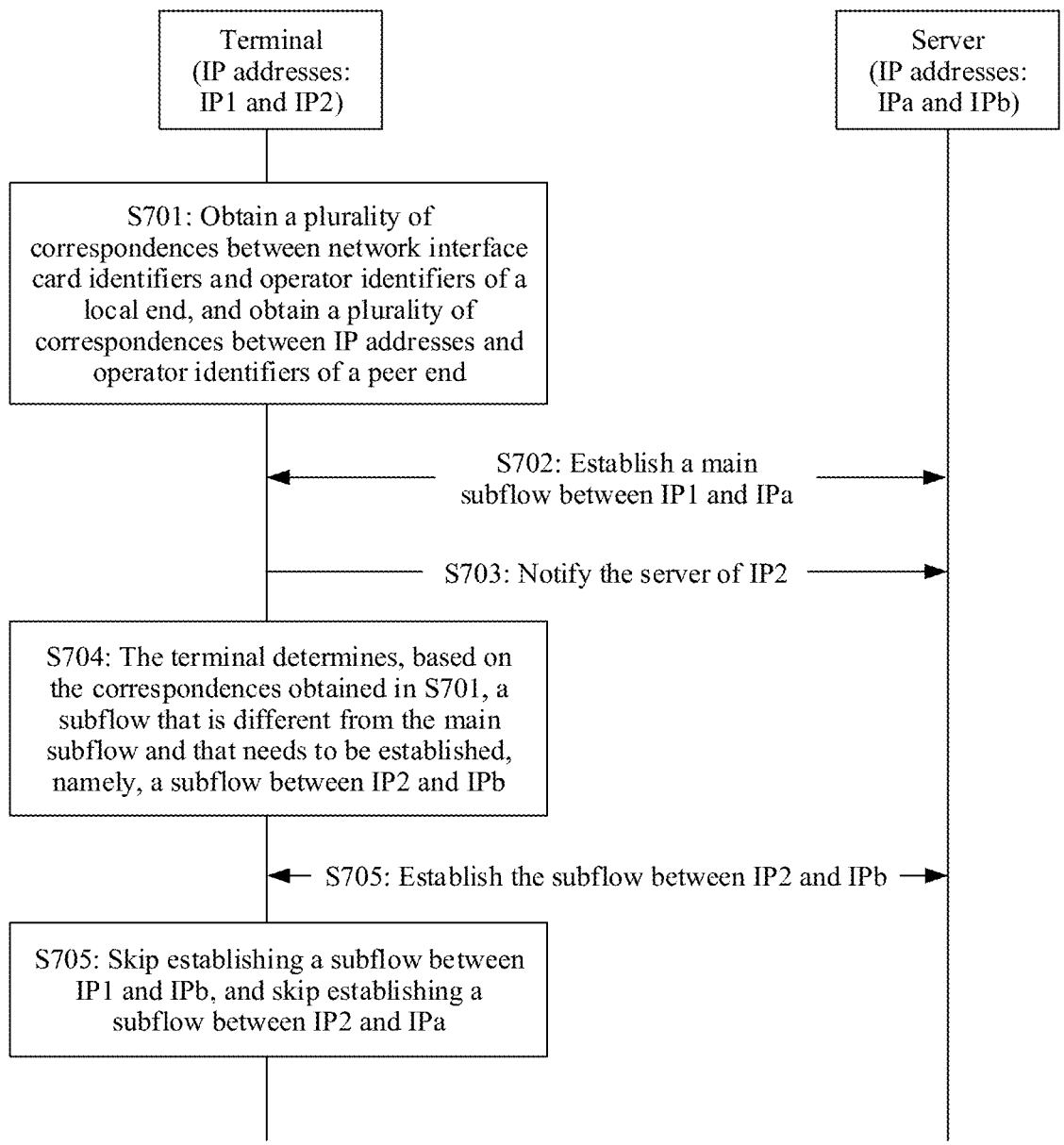
FIG. 7 is a schematic interaction diagram of a subflow establishment method according to this application.
Figure 8:
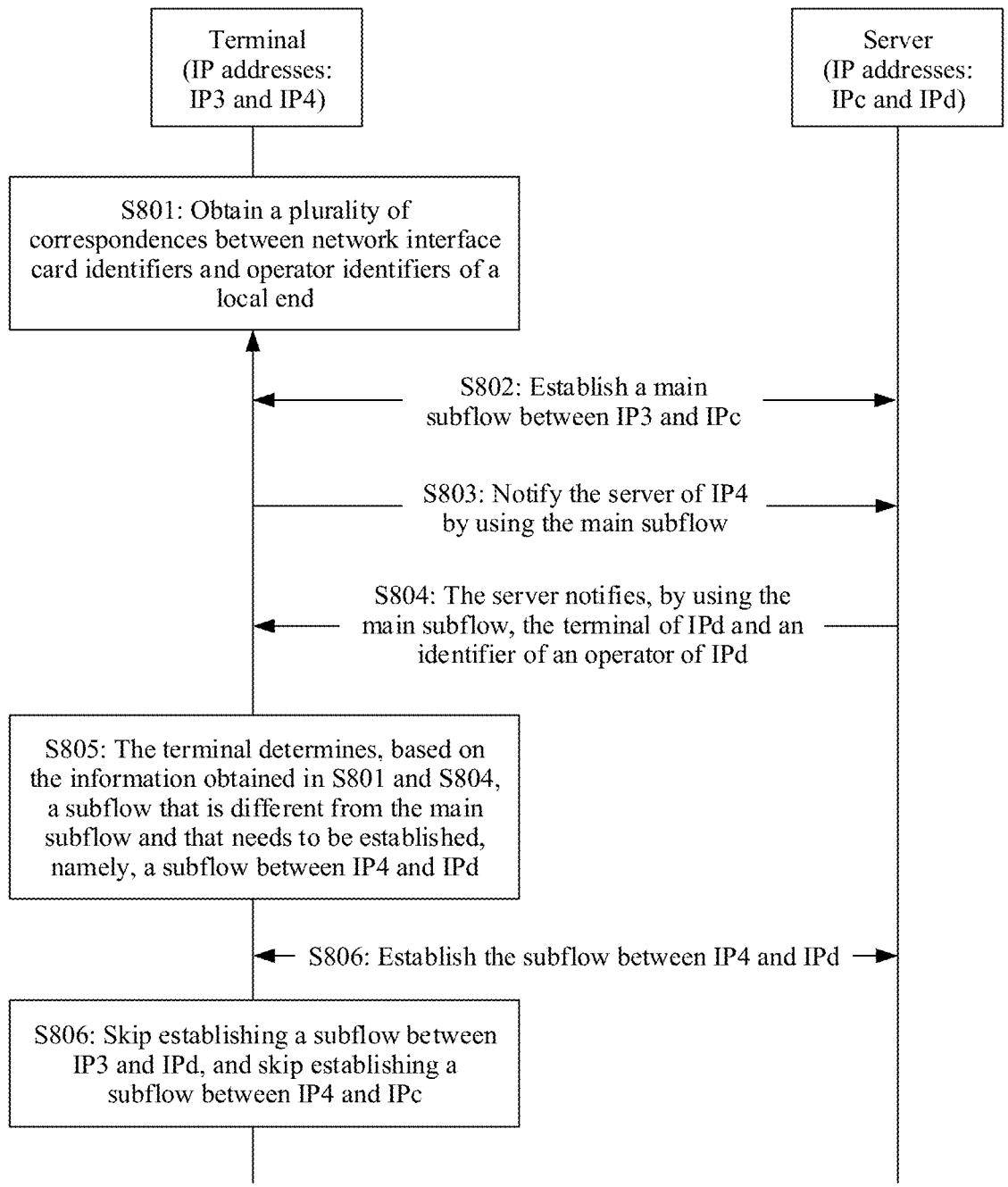
FIG. 8 is another schematic interaction diagram of a subflow establishment method according to this application.

The following describes embodiments of the foregoing subflow establishment method in two scenarios with reference to FIG. 7 and FIG. 8. In the embodiments in FIG. 7 and FIG. 8, the foregoing subflow establishment method is implemented based on modification on an existing fullmesh mechanism.

In a scenario corresponding to FIG. 7, a terminal runs an application A, and the terminal needs to establish a multipath connection to a server corresponding to the application A. The application A on the terminal is a client, and a serving end runs on the server. IP addresses of the terminal are IP1 homed to China Mobile and IP2 homed to China Telecom, and IP addresses of the server that correspond to the application A are IPa belonging to China Mobile and IPb belonging to China Telecom. In a process corresponding to FIG. 7, before a main subflow is established, a transport layer of the terminal obtains a plurality of correspondences between IP addresses and operator identifiers of a peer end from an application layer of the local end. In the embodiment corresponding to FIG. 7, a network interface card currently used by default by the terminal is a network interface card configured to access China Mobile.

S701: The terminal obtains a plurality of correspondences between network interface card identifiers and operator identifiers of the local end, and obtains a plurality of correspondences between IP addresses and operator identifiers of the peer end, where the peer end is the server corresponding to the application A.

The application layer of the terminal delivers the plurality of correspondences between IP addresses and operator identifiers of the peer end to a multipath transmission protocol stack. The application A has already stored the plurality of correspondences between IP addresses and operator identifiers of the peer end. The plurality of correspondences may be delivered by the application A, or may be obtained from the application A by a configuration module of the application layer and then delivered to the multipath transmission protocol stack. For example, the IP addresses of the peer end include IPa belonging to China Mobile and IPb belonging to China Telecom.

A network layer of the terminal reports, to the multipath transmission protocol stack, a plurality of network interface card identifiers of the terminal and an operator identifier corresponding to each of the plurality of network interface card identifiers. A format thereof is as follows:

{
   Name of a Wi-Fi network interface card: operator identifier corresponding to a Wi-Fi network
   Name of an LTE network interface card: operator identifier corresponding to an LTE network
}

When a SIM card is installed on the terminal, a name of the SIM card may also be used as a name of a network interface card of a mobile cellular network. For example, the terminal has two network interface cards that respectively belong to China Mobile and China Telecom. China Mobile provides a cellular mobile network. Operator identifiers may be represented as follows:

```
{
  SIM card serial number: CMCC
  Wi-Fi network interface card identifier: Telecom
}
```

In the foregoing example, the operator identifiers are represented by using names of the operators.

The protocol stack of the transport layer of the terminal may store the obtained correspondences of the local end. The default network interface card of the terminal (namely a network interface card preferentially used currently) is a China Mobile SIM card. The terminal selects a corresponding destination IP address, that is, IPa that also belongs to China Mobile, based on the operator corresponding to the SIM card. An IP address corresponding to the SIM card of the terminal is IP1.

S702: The terminal and the server establish a subflow by using IP1 and IPa.

The subflow established by using IP1 and IPa may be referred to as a main subflow.

S703: The terminal notifies the server of the other IP address, namely IP2, of the local end by using the main subflow.

S703 may be implemented by using a packet in the fullmesh mechanism described above. For example, the packet carries the address notification signaling shown in FIG. 6, but may not carry an operator identifier of IP2 in an extension field.

S704: The terminal determines, based on the correspondences obtained in S701, a subflow that is different from the main subflow and that needs to be established.

The protocol stack of the transport layer of the terminal may store matching logic, determine an IP address pair that is homed to a same operator, and establish a subflow for the IP address pair that is homed to a same operator. For example, this operation may be performed by a path management module in the multipath transmission protocol stack of the transport layer.

S705: Establish the subflow determined in S704 between the terminal and the server.

In one embodiment, IP1 and IPb are homed to different operators, and IP2 and IPa are homed to different operators. No subflow is established for each of the two pairs of IP addresses. IP2 and IPb are homed to a same operator, and the subflow is established for this pair of IP addresses.

In a scenario corresponding to FIG. 8, a terminal runs an application B, and the terminal needs to establish a multipath connection to a server corresponding to the application B. The application B on the terminal is a client, and a serving end runs on the server. IP addresses of the terminal are IP3 homed to China Unicom and IP4 homed to another operator, and IP addresses of the server that correspond to the application B are IPc homed to China Unicom and IPd homed to another operator. In a method corresponding to FIG. 8, the server sends, to the terminal by using a main subflow, corresponding IP addresses of the application B on the server and operator identifiers corresponding to these IP addresses. A network interface card currently used by default by the terminal is a network interface card used to access China Unicom.

S801: The terminal obtains a plurality of correspondences between network interface card identifiers and operator identifiers of the local end.

A multipath transmission protocol stack of a transport layer of the terminal obtains, from a lower layer (such as a network layer or a driver layer), the network interface card identifiers and the operator identifier corresponding to each of the plurality of network interface card identifiers. For a format thereof, refer to related paragraphs in S701.

S802: The terminal establishes a subflow by using the IP address IP3 corresponding to the default network interface card of the terminal and the IP address IPc that is of the peer end and that belongs to a same operator as that of IP3.

The peer-end IP address IPc may be obtained by the transport layer of the terminal from the application B, where the application B obtains the peer-end IP address IPc from a server side. This process may be performed before S801. For explanations, refer to related paragraphs above. The subflow between IP3 and IPc is referred as the main subflow. In addition, in S802, the terminal already knows the operator to which the IP address IP3 of the server is homed, that is, already knows an operator identifier corresponding to IP3.

An order of S802 and S803 can be changed.

S803: The terminal sends, to the server by using the subflow between IP3 and IPc, the other IP address different from IP3 of the client, namely, IP4.

S603 and S803 are operations in an existing subflow establishment process.

Standard address notification signaling may be used in S803. For a format of the address notification signaling, refer to FIG. 6. In one embodiment, an extension field does not carry the operator identifier of IP3.

S804: The server sends IPd and an operator identifier of IPd to the terminal by using the subflow between IP3 and IPc, where IPd is an IP address other than IPc that corresponds to the application B.

IPd and the operator identifier of IPd in S804 may be carried in improved address notification signaling. The address notification signaling is existing signaling and is used to notify a peer end of an IP address of a local end. However, the existing address notification signaling does not carry an operator identifier of the IP address. An operator identifier is recorded in the extension field of the standard address notification signaling. For the format of the address notification signaling, refer to FIG. 6. The operator identifier is recorded in a field after a port field.

A protocol layer of the terminal may store the obtained correspondences between IP addresses and operator identifiers.

S805: The terminal determines, based on the known operators corresponding to the plurality of network interface cards of the local end and the known operators to which the plurality of peer-end IP addresses are homed, a subflow that is different from the main subflow and that needs to be established.

Embodiment of S805 is similar to that of S705. The protocol stack of the transport layer of the terminal may store matching logic and determine an IP address pair that is homed to a same operator. For example, the determining action may be performed by a path management module in the multipath transmission protocol stack of the transport layer.

S806: Establish the subflow determined in S805 between the terminal and the server.

In one embodiment, IP3 and IPd are homed to different operators, IP4 and IPc are homed to different operators, and the protocol stack prohibits subflow establishment therebetween. IP4 and IPd are homed to a same operator, and the protocol stack allows subflow establishment therebetween.

The embodiments corresponding to FIG. 7 and FIG. 8 describe two embodiments. For the various terms and operations in the embodiments, refer to corresponding paragraphs above for further understanding. As one end of the multipath connection, before establishing a subflow, the terminal collects the plurality of IP addresses of the local end and the peer end and the operator identifiers of these IP addresses, and establishes a subflow only between IP addresses that are homed to a same operator. This prevents negative impact, of a subflow established between IP addresses homed to different operators, on transmission performance of a multipath connection, thereby better leveraging an advantage of the multipath connection in transmission performance in comparison with a single-path connection. In comparison with a case in which subflows are established for all possible IP address pairs, a quantity of subflows maintained by the local end and the peer end is reduced, and therefore burden on the devices and a network is reduced.

The following describes various subflow establishment apparatuses configured to perform the foregoing technical solutions in some embodiments. For an apparatus embodiment method and various explanatory descriptions of the method, refer to corresponding paragraphs above. Details are not described herein again. Actually, some embodiments of these apparatuses have been described above in this application, for example, in FIG. 4, FIG. 5a, and FIG. 5b. In addition, this application does not limit embodiments of the various subflow establishment apparatuses configured to perform the foregoing technical solutions. For example, the apparatus may include one or more modules. Names of these modules are not limited either. A connection relationship between these modules is determined by operations executed by these modules and a logic relationship between functions of these modules.

Figure 9:
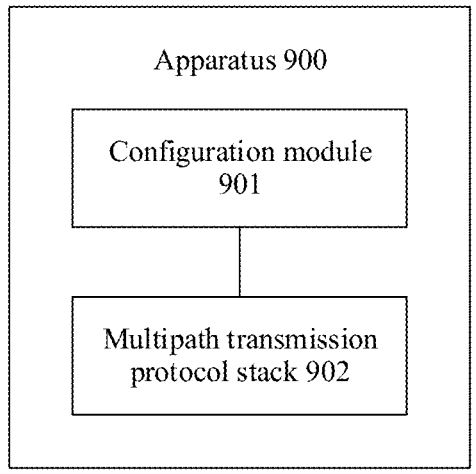
FIG. 9 is a schematic structural diagram of a subflow establishment apparatus according to this application.

FIG. 9 is a schematic structural diagram of an apparatus 900 according to this application. The apparatus 900 is located on a local-end device, namely, the first device mentioned above. The local-end device includes a plurality of network interface cards. The apparatus 900 includes a configuration module 901 and a multipath transmission protocol stack 902. The apparatus 900 may perform various subflow establishment methods of the local end. In some embodiments, the configuration module 901 is configured to determine an identifier of an operator whose network is accessed by each of the plurality of network interface cards of the first device. The configuration module 901 may obtain the information from a protocol stack beneath a transport layer of the first device. The configuration module 901 is further configured to determine a plurality of Internet Protocol IP addresses of a second device and an identifier of an operator corresponding to each of the plurality of IP addresses of the second device. The configuration module 901 may obtain the information from a client of the local-end device.

Alternatively, the configuration module 901 is configured to determine an identifier of an operator whose network is accessed by each of the plurality of network interface cards of the first device. The configuration module 901 may obtain the information from a protocol stack beneath a transport layer of the first device. The multipath transmission protocol stack 902 is configured to determine a plurality of Internet Protocol (IP) addresses of a second device and an identifier of an operator corresponding to each of the plurality of IP addresses of the second device. The multipath transmission protocol stack 902 may receive the information from the second device.

The multipath transmission protocol stack 902 is further configured to establish a plurality of first subflows based on the identifier of the operator whose network is accessed by each of the plurality of network interface cards and the identifier of the operator corresponding to each of the plurality of IP addresses of the second device, where the plurality of first subflows are subflows of a multipath connection between the first device and the second device, and an operator whose network is accessed by a network interface card that is of the first device and that is used by each of the plurality of first subflows is the same as an operator corresponding to an IP address that is of the second device and that is used by the first subflow.

There may be a plurality of embodiments for the multipath transmission protocol stack 902 to establish the plurality of first subflows based on the identifier of the operator whose network is accessed by each of the plurality of network interface cards and the identifier of the operator corresponding to each of the plurality of IP addresses of the second device.

For example, each of the plurality of network interface cards of the first device corresponds to an IP address of the first device. The multipath transmission protocol stack 902 is configured to: determine a plurality of IP address pairs by matching the identifier of the operator whose network is accessed by each of the plurality of network interface cards and the identifier of the operator corresponding to each of the plurality of IP addresses of the second device, where an operator whose network is accessed by a network interface card corresponding to an IP address of the first device in each of the plurality of IP address pairs is the same as an operator corresponding to an IP address of the second device included in the IP address pair; and establish a plurality of first subflows that are in a one-to-one correspondence with the plurality of IP address pairs.

For another example, the multipath transmission protocol stack 902 is configured to: determine, by matching the identifier of the operator whose network is accessed by each of the plurality of network interface cards and the identifier of the operator corresponding to each of the plurality of IP addresses of the second device, an IP address that is of the second device and that corresponds to each of the plurality of network interface cards, where an operator corresponding to the IP address that is of the second device and that corresponds to each of the plurality of network interface cards is the same as the operator whose network is accessed by the network interface card; and send, by using the plurality of network interface cards, a packet to the IP address that is of the second device and that corresponds to each of the plurality of network interface cards, to establish the plurality of first subflows.

For another example, the multipath transmission protocol stack 902 is configured to: obtain a plurality of combinations, where each of the plurality of combinations indicates a combination of one of the plurality of network interface cards and one of the plurality of IP addresses; and if an operator whose network is accessed by the network interface card indicated by each of the plurality of combinations is the same as an operator corresponding to the IP address indicated by the combination, establish one first subflow by using the combination of the network interface card and the IP address; or if an operator whose network is accessed by the network interface card indicated by each combination is different from an operator corresponding to the IP address indicated by the combination, prohibit establishment of a subflow by using the combination of the network interface card and the IP address.

For another example, the multipath transmission protocol stack 902 is configured to: establish a plurality of subflows based on the plurality of network interface cards and the plurality of IP addresses of the second device, where the plurality of subflows include the plurality of first subflows;

and remove all second subflows in the plurality of subflows by matching the identifier of the operator whose network is accessed by each of the plurality of network interface cards and the identifier of the operator corresponding to each of the plurality of IP addresses of the second device, where an operator whose network is accessed by a network interface card that is of the first device and that is used by the second subflow is different from an operator corresponding to an IP address that is of the second device and that is used by the second subflow.

In some embodiments, the first device includes a first network interface card and at least one second network interface card, and the first network interface card is a network interface card preferentially used by the first device currently. The configuration module 901 is configured to determine an identifier of an operator whose network is accessed by each of the at least one second network interface card. The multipath transmission protocol stack 902 is configured to send a packet to a first Internet Protocol IP address of the second device by using the first network interface card, to establish a main subflow of a multipath connection between the first device and the second device, where an operator whose network is accessed by the first network interface card is the same as an operator corresponding to the first IP address. The multipath transmission protocol stack 902 is further configured to: receive, from the second device by using the main subflow, at least one second IP address and an identifier of an operator corresponding to each of the at least one second IP address, where the at least one second IP address is an IP address other than the first IP address of the second device; and establish at least one other subflow of the multipath connection based on the identifier of the operator whose network is accessed by each of the at least one second network interface card and the identifier of the operator corresponding to each of the at least one second IP address, where an operator whose network is accessed by a second network interface card used by each of the at least one other subflow is the same as an operator corresponding to a second IP address used by the subflow.

There are also embodiments for establishing the at least one other subflow of the multipath connection based on the identifier of the operator whose network is accessed by each of the at least one second network interface card and the identifier of the operator corresponding to each of the at least one second IP address. Refer to the examples above.

According to another aspect, this application describes another subflow establishment apparatus. The apparatus is used on a second device, namely, the peer-end device described above. For implementation details, refer to the foregoing descriptions. The apparatus includes a sending module. The sending module is configured to send, to a first device by using a first subflow, an IP address of the second device and an identifier of an operator corresponding to the IP address, where the first subflow is a subflow of a multipath connection between the first device and the second device. The apparatus further includes a receiving module. The receiving module is configured to cooperate with the sending module, and communicate with the first device by using the IP address, to establish a second subflow of the multipath connection, where an operator accessed by the second subflow from the first device is the same as the operator corresponding to the IP address.

Figure 10:
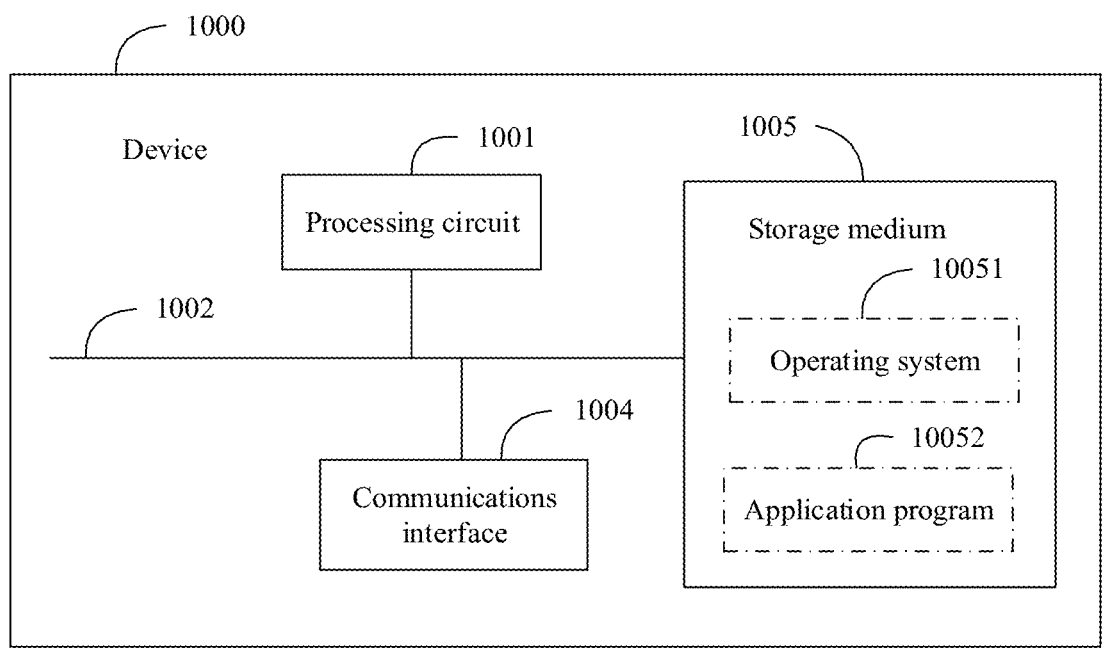
FIG. 10 is a schematic structural diagram of a subflow establishment device according to this application.

FIG. 10 depicts a device 1000 provided in this application. The device depicted in FIG. 10 may be a device supporting a multipath transmission protocol, such as a terminal, a cloud server, a cloud proxy server, a load balancer, or a hybrid access gateway. In other words, the device in FIG. 10 may be the terminal in FIG. 2 or the server in FIG. 2. The device 1000 includes at least one processing circuit 1001, a communications interface 1004, a storage medium 1005, and at least one communications bus 1002. The communications interface 1004 includes a plurality of network interface cards, and the plurality of network interface cards may be physical network interface cards or may be virtual network interface cards. This is not illustrated in the figure. The communications bus 1002 is configured to implement connection and communication between these components. In other words, the device that includes a processor, a memory, and a network interface card and that is depicted in FIG. 3 is an embodiment of the device in FIG. 10. A storage circuit may store a client or a serving end of an application, a protocol stack program, and an instruction for performing any of the foregoing subflow establishment methods. In other words, the software architecture depicted in FIG. 4 may be stored in the storage medium 1005. The device depicted in FIG. 10 may perform, by using the processing circuit 1001 executing code in the storage medium 1005 in combination with the communications interface 1004, a part performed by one device in the subflow establishment methods described above. Certainly, if two devices as depicted in FIG. 10 communicate with each other, the interaction processes described above may be performed, such as the examples described in corresponding paragraphs of FIG. 5a, FIG. 5b, FIG. 7, and FIG. 8. In a process of performing the subflow establishment methods, an instruction in a format such as the one shown in FIG. 6 may be used. Embodiments, and embodiment details, and beneficial effects are not described herein again.

In addition, by executing the code in the storage medium 1005 in combination with the communications interface 1004, the processing circuit 1001 may implement the apparatus corresponding to FIG. 9. For example, the configuration module 901 and the multipath transmission protocol stack 902 in the apparatus 900 may be implemented by the processing circuit 1001 executing the instruction in the storage medium 1005 to drive the communications interface 1004, and may be implemented by different processes or threads that run in the processing circuit 1001 and that execute the instruction to call the communications interface.

In one embodiment, the device 1000 may be a terminal device. If the device 1000 is a terminal device, the device 1000 may optionally include a user interface, and include a display (such as a touchscreen, an LCD, a CRT, a holographic device, or a projector, a keyboard, or a pointer device (such as a mouse, a trackball, a touch panel, or a touch screen). In addition, the terminal device usually serves as a subflow establishment initiator, namely, the first device or the local-end device described above. The terminal device has an operating system, and a client for which a subflow needs to be established. The storage medium 1005 may include a read-only memory and a random access memory, and provide an instruction and data for the processing circuit 1001. A part of the storage medium 1005 may further include a non-volatile random access memory (NVRAM).

If the device is a cloud server, or a cloud proxy server, the storage medium 1005 stores the following elements, executable modules, or data structures, or subsets or extended subsets thereof: the operating system, including various system programs such as a framework layer, a kernel library layer, and a driver layer, and configured to implement various basic services and process hardware-based tasks; an application program, including various application programs such as a launcher, a media player, and a browser, and configured to implement various application services. The client and the serving end described above are application programs. If the device is a gateway, the storage medium 1005 may store only program code required for executing the methods described above.

The processing circuit 1001 may be implemented by one or more processors, and the processing circuit 1001 may be a central processing unit (CPU). The processing circuit 1001 may be a general-purpose processor, a digital signal processor (DSP), an application specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like.

The communications bus 1002 may include a data bus, a power bus, a control bus, a signal status bus, and the like. For clear description in this embodiment, various buses are illustrated as the communications bus 1002 in FIG. 10.

An communications interface 1004 may be a communications interface of a physical machine. The communications interface may be a wireless communications interface. For example, the wireless communications interface may be a wireless module, a network interface card, or the like of the physical machine. The processing circuit 1001 may send data to and receive data from another device, for example, another physical machine, by using the communications interface 1004.

The storage medium 1005 may include a volatile memory, such as a random access memory (RAM); and the storage medium 1005 may further include a non-volatile memory, such as a read-only memory (ROM), a flash memory, a hard disk drive (HDD), or a solid-state drive (SSD). Alternatively, the storage medium 1005 may include a combination of the foregoing types of memories.

The storage medium 1005 may include an underlying storage medium and a memory. For example, the underlying storage medium may be a storage medium in a network interface card or the like. The memory is coupled to the underlying storage medium, and functions as a cache of the underlying storage medium.

This application further provides a computer-readable storage medium. The computer-readable storage medium includes a computer executable instruction. When a physical machine runs, a processor of the physical machine executes the computer executable instruction to enable the physical machine to perform any of the methods provided in the embodiments of this application.

Optionally, the computer-readable storage medium in this embodiment may be the storage medium 1005 shown in FIG. 10.

This application further describes a computer program product. The computer program product includes an instruction. When the instruction is run on a computer, the computer is enabled to perform any of the methods described in this application.

The foregoing descriptions about the embodiments allow a person skilled in the art to understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For detailed working processes of the foregoing system, apparatus, and unit, refer to corresponding processes in the foregoing method embodiments, and details are not described herein again.

In the embodiments provided in this application, it should be understood that the disclosed device, apparatus, and method may be implemented in other manners. For example, the described apparatus embodiment is merely an example. For example, the module division is merely logical function division and may be other division in actual implementation. For example, a plurality of units or components may be combined or integrated into another system, or some features may be ignored or not performed. For example, the sending module and the receiving module may be one module, such as a transceiver module or a transceiver. In addition, the displayed or discussed mutual couplings or direct couplings or communication connections may be implemented by using some interfaces, for example, the interface function described above. The indirect couplings or communication connections between the apparatuses or units may be implemented in electrical, mechanical, or other forms.

When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD), or a phase change memory).

The method and apparatus provided in this application are described above. The foregoing embodiments are merely intended to help understand the method recorded in this application. In addition, with respect to the embodiment manners and the application scope, modifications may be made by a person of ordinary skill in the art based on the content recorded in this application. Therefore, the specification shall not be construed as a limitation on this application.

The invention claimed is:

1. A subflow establishment method comprising: determining, by a first device, an identifier of an operator whose network is accessed by each of a plurality of network interface cards of the first device; determining, by the first device, a plurality of Internet Protocol (IP) addresses of a second device and an identifier of an operator corresponding to each of the plurality of IP addresses of the second device; and establishing, by the first device, a plurality of first subflows based on the identifier of the operator whose network is accessed by each of the plurality of network interface cards and the identifier of the operator corresponding to each of the plurality of IP addresses of the second device, wherein the plurality of first subflows are subflows of a multipath connection between the first device and the second device, and an operator whose network is accessed by a network interface card that is of the first device and that is used by each of the plurality of first subflows is the same as an operator corresponding to an IP address that is of the second device and that is used by the first subflow, wherein each of the plurality of network interface cards of the first device corresponds to an IP address of the first device, and the establishing, by the first device, a plurality of first subflows based on the identifier of the operator whose network is accessed by each of the plurality of network interface cards and the identifier of the operator corresponding to each of the plurality of IP addresses of the second device comprises: determining, by the first device, a plurality of IP address pairs by matching the identifier of the operator whose network is accessed by each of the plurality of network interface cards and the identifier of the operator corresponding to each of the plurality of IP addresses of the second device, wherein an operator whose network is accessed by a network interface card corresponding to an IP address of the first device in each of the plurality of IP address pairs is the same as an operator corresponding to an IP address of the second device comprised in the IP address pair; and establishing, by the first device, a plurality of first subflows that are in a one-to-one correspondence with the plurality of IP address pairs, wherein the plurality of IP address pairs belong to networks of a same type.

2. The method according to claim 1, wherein the establishing, by the first device, a plurality of first subflows based on the identifier of the operator whose network is accessed by each of the plurality of network interface cards and the identifier of the operator corresponding to each of the plurality of IP addresses of the second device comprises: determining, by the first device by matching the identifier of the operator whose network is accessed by each of the plurality of network interface cards and the identifier of the operator corresponding to each of the plurality of IP addresses of the second device, an IP address that is of the second device and that corresponds to each of the plurality of network interface cards, wherein an operator corresponding to the IP address that is of the second device and that corresponds to each of the plurality of network interface cards is the same as the operator whose network is accessed by the network interface card; and sending, by the first device by using the plurality of network interface cards, a packet to the IP address that is of the second device and that corresponds to each of the plurality of network interface cards, to establish the plurality of first subflows.

3. The method according to claim 1, wherein the establishing, by the first device, a plurality of first subflows based on the identifier of the operator whose network is accessed by each of the plurality of network interface cards and the identifier of the operator corresponding to each of the plurality of IP addresses of the second device comprises: obtaining, by the first device, a plurality of combinations, wherein each of the plurality of combinations indicates a combination consisting of one of the plurality of network interface cards and one of the plurality of IP addresses; and if an operator whose network is accessed by the network interface card indicated by each of the plurality of combinations is the same as an operator corresponding to the IP address indicated by the combination, establishing one first subflow by using the combination of the network interface card and the IP address; or if an operator whose network is accessed by the network interface card indicated by each combination is different from an operator corresponding to the IP address indicated by the combination, prohibiting establishment of a subflow by using the combination of the network interface card and the IP address.

4. The method according to claim 1, wherein the establishing, by the first device, a plurality of first subflows based on the identifier of the operator whose network is accessed by each of the plurality of network interface cards and the identifier of the operator corresponding to each of the plurality of IP addresses of the second device comprises: establishing, by the first device, a plurality of subflows based on the plurality of network interface cards and the plurality of IP addresses of the second device, wherein the plurality of subflows comprise the plurality of first subflows; and removing, by the first device, all second subflows in the plurality of subflows by matching the identifier of the operator whose network is accessed by each of the plurality of network interface cards and the identifier of the operator corresponding to each of the plurality of IP addresses of the second device, wherein an operator whose network is accessed by a network interface card that is of the first device and that is used by the second subflow is different from an operator corresponding to an IP address that is of the second device and that is used by the second subflow.

5. The method according to claim 1, wherein the determining, by the first device, a plurality of IP addresses of a second device and an identifier of an operator corresponding to each of the plurality of IP addresses of the second device comprises: locally obtaining, by a multipath transmission protocol stack of the first device, the plurality of IP addresses of the second device and the identifier of the operator corresponding to each of the plurality of IP addresses of the second device.

6. The method according to claim 1, wherein the determining, by the first device, a plurality of IP addresses of a second device and an identifier of an operator corresponding to each of the plurality of IP addresses of the second device comprises: receiving, by the first device from the second device, the plurality of IP addresses of the second device and the identifier of the operator corresponding to each of the plurality of IP addresses of the second device.

7. A subflow establishment method applied to a first device, the first device comprising a first network interface card and at least one second network interface card, the first network interface card is a network interface card currently used by the first device, the method comprising: determining, by the first device, an identifier of an operator whose network is accessed by each of the at least one second network interface card; sending, by the first device, a packet to a first Internet Protocol (IP) address of a second device by using the first network interface card to establish a main subflow of a multipath connection between the first device and the second device, wherein an operator whose network is accessed by the first network interface card is the same as an operator corresponding to the first IP address; receiving, by the first device from the second device by using the main subflow, at least one second IP address and an identifier of an operator corresponding to each of the at least one second IP address, wherein the at least one second IP address is an IP address other than the first IP address of the second device; and establishing, by the first device, at least one other subflow of the multipath connection based on the identifier of the operator whose network is accessed by each of the at least one second network interface card and the identifier of the operator corresponding to each of the at least one second IP address, wherein an operator whose network is accessed by a second network interface card used by each of the at least one other subflow is the same as an operator corresponding to a second IP address used by the subflow, wherein each of the at least one second network interface card corresponds to an IP address of the first device, and the establishing, by the first device, at least one other subflow of the multipath connection based on the identifier of the operator whose network is accessed by each of the at least one second network interface card and the identifier of the operator corresponding to each of the at least one second IP address comprises: determining, by the first device, at least one IP address pair by matching the identifier of the operator whose network is accessed by each of the at least one second network interface card and the identifier of the operator corresponding to each of the at least one second IP address, wherein an operator whose network is accessed by a second network interface card corresponding to an IP address of the first device in each of the at least one IP address pair is the same as an operator corresponding to a second IP address in the IP address pair, and establishing, by the first device, at least one other subflow that is in a one-to-one correspondence with the at least one IP address pair, wherein the at least one IP address pair belongs to networks of a same type.

8. The method according to claim 7, wherein the establishing, by the first device, at least one other subflow of the multipath connection based on the identifier of the operator whose network is accessed by each of the at least one second network interface card and the identifier of the operator corresponding to each of the at least one second IP address comprises: determining, by the first device by matching the identifier of the operator whose network is accessed by each of the at least one second network interface card and the identifier of the operator corresponding to each of the at least one second IP address, a second IP address accessed by each of the at least one second network interface card, wherein an operator corresponding to the second IP address corresponding to each of the at least one second network interface card is the same as the operator whose network is accessed by the second network interface card; and sending, by the first device by using the at least one second network interface card, a packet to the second IP address corresponding to each of the at least one second network interface card, to establish the at least one other subflow.

9. The method according to claim 7, wherein the establishing, by the first device, at least one other subflow of the multipath connection based on the identifier of the operator whose network is accessed by each of the at least one second network interface card and the identifier of the operator corresponding to each of the at least one second IP address comprises: obtaining, by the first device, at least one combination, wherein each of the at least one combination indicates a combination consisting of one of the at least one second network interface card and one of the at least one second IP address; and if an operator whose network is accessed by the second network interface card indicated by each of the at least one combination is the same as an operator corresponding to the second IP address indicated by the combination, establishing one other subflow of the multipath connection by using the combination of the second network interface card and the second IP address; or if an operator whose network is accessed by the second network interface card indicated by each of the at least one combination is different from an operator corresponding to the second IP address indicated by the combination, prohibiting establishment of a subflow of the multipath connection by using the combination of the second network interface card and the second IP address.

10. The method according to claim 7, wherein the establishing, by the first device, at least one other subflow of the multipath connection based on the identifier of the operator whose network is accessed by each of the at least one second network interface card and the identifier of the operator corresponding to each of the at least one second IP address comprises: establishing, by the first device, at least one subflow based on the at least one second network interface card and the at least one second IP address, wherein the at least one subflow comprises the at least one other subflow; and removing, by the first device, by matching the identifier of the operator whose network is accessed by each of the at least one second network interface card and the identifier of the operator corresponding to each of the at least one second IP address, a subflow that does not meet a requirement in the at least one subflow, wherein an operator whose network is accessed by a second network interface card used by the subflow that does not meet the requirement is different from an operator corresponding to a second IP address used by the subflow that does not meet the requirement.

11. The method according to claim 7, wherein the method further comprises: obtaining, by a multipath transmission protocol stack of the first device, the first IP address of the second device from an application layer of the first device.

12. A device operating as a first device configured to establish a subflow comprising: a processing circuit; a communications interface; and a storage medium, wherein the storage medium stores an instruction, the communications interface is configured to exchange information with another device according to the instruction delivered by the processing circuit, the processing circuit configured to run the instruction in the storage medium to perform operations comprising: determining, an identifier of an operator whose network is accessed by each of a plurality of network interface cards of the first device; determining, a plurality of Internet Protocol (IP) addresses of a second device and an identifier of an operator corresponding to each of the plurality of IP addresses of the second device; and establishing, a plurality of first subflows based on the identifier of the operator whose network is accessed by each of the plurality of network interface cards and the identifier of the operator corresponding to each of the plurality of IP addresses of the second device, wherein the plurality of first subflows are subflows of a multipath connection between the first device and the second device, and an operator whose network is accessed by a network interface card that is of the first device and that is used by each of the plurality of first subflows is the same as an operator corresponding to an IP address that is of the second device and that is used by the first subflow, wherein each of the plurality of network interface cards of the first device corresponds to an IP address of the first device, and the establishing, a plurality of first subflows based on the identifier of the operator whose network is accessed by each of the plurality of network interface cards and the identifier of the operator corresponding to each of the plurality of IP addresses of the second device comprises: determining, a plurality of IP address pairs by matching the identifier of the operator whose network is accessed by each of the plurality of network interface cards and the identifier of the operator corresponding to each of the plurality of IP addresses of the second device, wherein an operator whose network is accessed by a network interface card corresponding to an IP address of the first device in each of the plurality of IP address pairs is the same as an operator corresponding to an IP address of the second device comprised in the IP address pair; and establishing, a plurality of first subflows that are in a one-to-one correspondence with the plurality of IP address pairs, wherein the plurality of IP address pairs belong to networks of a same type.

13. The device according to claim 12, wherein the establishing, a plurality of first subflows based on the identifier of the operator whose network is accessed by each of the plurality of network interface cards and the identifier of the operator corresponding to each of the plurality of IP addresses of the second device comprises: determining, by matching the identifier of the operator whose network is accessed by each of the plurality of network interface cards and the identifier of the operator corresponding to each of the plurality of IP addresses of the second device, an IP address that is of the second device and that corresponds to each of the plurality of network interface cards, wherein an operator corresponding to the IP address that is of the second device and that corresponds to each of the plurality of network interface cards is the same as the operator whose network is accessed by the network interface card; and sending, by using the plurality of network interface cards, a packet to the IP address that is of the second device and that corresponds to each of the plurality of network interface cards, to establish the plurality of first subflows.

14. The device according to claim 12, wherein the establishing, a plurality of first subflows based on the identifier of the operator whose network is accessed by each of the plurality of network interface cards and the identifier of the operator corresponding to each of the plurality of IP addresses of the second device comprises: obtaining, a plurality of combinations, wherein each of the plurality of combinations indicates a combination consisting of one of the plurality of network interface cards and one of the plurality of IP addresses; and if an operator whose network is accessed by the network interface card indicated by each of the plurality of combinations is the same as an operator corresponding to the IP address indicated by the combination, establishing one first subflow by using the combination of the network interface card and the IP address; or if an operator whose network is accessed by the network interface card indicated by each combination is different from an operator corresponding to the IP address indicated by the combination, prohibiting establishment of a subflow by using the combination of the network interface card and the IP address.

15. The device according to claim 12, wherein the establishing, a plurality of first subflows based on the identifier of the operator whose network is accessed by each of the plurality of network interface cards and the identifier of the operator corresponding to each of the plurality of IP addresses of the second device comprises: establishing, a plurality of subflows based on the plurality of network interface cards and the plurality of IP addresses of the second device, wherein the plurality of subflows comprise the plurality of first subflows; and removing, all second subflows in the plurality of subflows by matching the identifier of the operator whose network is accessed by each of the plurality of network interface cards and the identifier of the operator corresponding to each of the plurality of IP addresses of the second device, wherein an operator whose network is accessed by a network interface card that is of the first device and that is used by the second subflow is different from an operator corresponding to an IP address that is of the second device and that is used by the second subflow.

16. The device according to claim 12, wherein the determining, a plurality of IP addresses of a second device and an identifier of an operator corresponding to each of the plurality of IP addresses of the second device comprises: locally obtaining, by a multipath transmission protocol stack of the first device, the plurality of IP addresses of the second device and the identifier of the operator corresponding to each of the plurality of IP addresses of the second device.

17. The device according to claim 12, wherein the determining, a plurality of IP addresses of a second device and an identifier of an operator corresponding to each of the plurality of IP addresses of the second device comprises: receiving, from the second device, the plurality of IP addresses of the second device and the identifier of the operator corresponding to each of the plurality of IP addresses of the second device.

* * * * *